United States Patent
Farwell et al.

(10) Patent No.: US 8,517,041 B2
(45) Date of Patent: Aug. 27, 2013

(54) PRESSURE RELIEF DEVICE ASSEMBLIES

(75) Inventors: Stephen P. Farwell, Owasso, OK (US); Gregory P. Klein, Owasso, OK (US); Geoffrey C. Brazier, Woodbury, MN (US); Gary M. Plunkett, Broken Arrow, OK (US)

(73) Assignee: BS&B Safety Systems, Inc., Tulsa, OK (US)

( * ) Notice: Subject to any disclaimer, the term of this patent is extended or adjusted under 35 U.S.C. 154(b) by 110 days.

(21) Appl. No.: 12/844,562

(22) Filed: Jul. 27, 2010

(65) Prior Publication Data
US 2011/0017315 A1 Jan. 27, 2011

Related U.S. Application Data

(60) Division of application No. 10/919,250, filed on Aug. 17, 2004, now Pat. No. 7,784,482, which is a continuation of application No. 10/035,229, filed on Jan. 4, 2002, now Pat. No. 6,792,964.

(60) Provisional application No. 60/259,691, filed on Jan. 5, 2001.

(51) Int. Cl.
*F16K 17/40* (2006.01)
*F16B 27/00* (2006.01)

(52) U.S. Cl.
USPC ............... 137/68.16; 137/68.25; 411/383; 411/396; 403/2

(58) Field of Classification Search
USPC .............. 137/68.11, 68.13–68.17, 68.19, 137/68.23–68.28; 411/378, 396, 39, 40, 43, 383; 285/2; 403/2
See application file for complete search history.

(56) References Cited

U.S. PATENT DOCUMENTS

| | | | |
|---|---|---|---|
| 2,138,159 A * | 11/1938 | Hanks | 285/2 |
| 2,576,431 A | 11/1951 | White | |
| 3,109,553 A | 11/1963 | Fike et al. | |
| 3,119,298 A * | 1/1964 | Brown | 411/396 |
| 3,121,509 A | 2/1964 | Porter | |
| 3,327,894 A | 6/1967 | Ferris | |
| 3,599,528 A * | 8/1971 | Kushnick | 285/2 |
| 3,704,807 A | 12/1972 | Lidgard | |
| 3,722,734 A | 3/1973 | Raidl, Jr. | |
| 4,043,481 A | 8/1977 | Herbst | |
| 4,072,160 A | 2/1978 | Hansen | |

(Continued)

FOREIGN PATENT DOCUMENTS

| | | |
|---|---|---|
| EP | 0 456 935 | 11/1991 |
| EP | 0 773 393 A2 | 5/1997 |

*Primary Examiner* — Kevin Lee
(74) *Attorney, Agent, or Firm* — Finnegan, Henderson, Farabow, Garrett & Dunner, L.L.P.

(57) ABSTRACT

The present invention is directed to pressure relief devices and to corresponding pressure relief assemblies that have improved vacuum resistance, improved fragmentation resistance, and/or improved burst control while maintaining low mass. The pressure relief device includes a substantially flat flange section and a domed section. The domed section may include a transitional line that defines a change in the shape of the domed section. The pressure relief device may also include a bracket for securing or aligning a domed section to a flange section. The pressure relief device may further include a stress distribution feature that is disposed transversely to a line of weakness in the domed section. The pressure relief assembly may include a fastener having a wire that is configured to break and release the pressure relief device when subject to a predetermined tensile load.

16 Claims, 24 Drawing Sheets

(56) References Cited

U.S. PATENT DOCUMENTS

| | | |
|---|---|---|
| 4,436,218 A | 3/1984 | Beese |
| 4,759,460 A | 7/1988 | Mozley |
| 4,787,180 A | 11/1988 | Robinson et al. |
| 4,819,823 A | 4/1989 | Kadakia et al. |
| 5,002,085 A | 3/1991 | FitzGerald |
| 5,036,632 A | 8/1991 | Short, III et al. |
| 5,267,666 A | 12/1993 | Hinrichs et al. |
| 5,411,158 A | 5/1995 | Kays et al. |
| 5,678,307 A | 10/1997 | Farwell |
| 6,070,365 A | 6/2000 | Leonard |
| 6,241,113 B1 | 6/2001 | Mozley et al. |
| 6,792,964 B2 * | 9/2004 | Farwell et al. ............. 137/68.25 |
| 7,396,182 B2 * | 7/2008 | Retat et al. ...................... 403/2 |
| 7,677,853 B2 * | 3/2010 | Donovan ...................... 411/361 |

\* cited by examiner

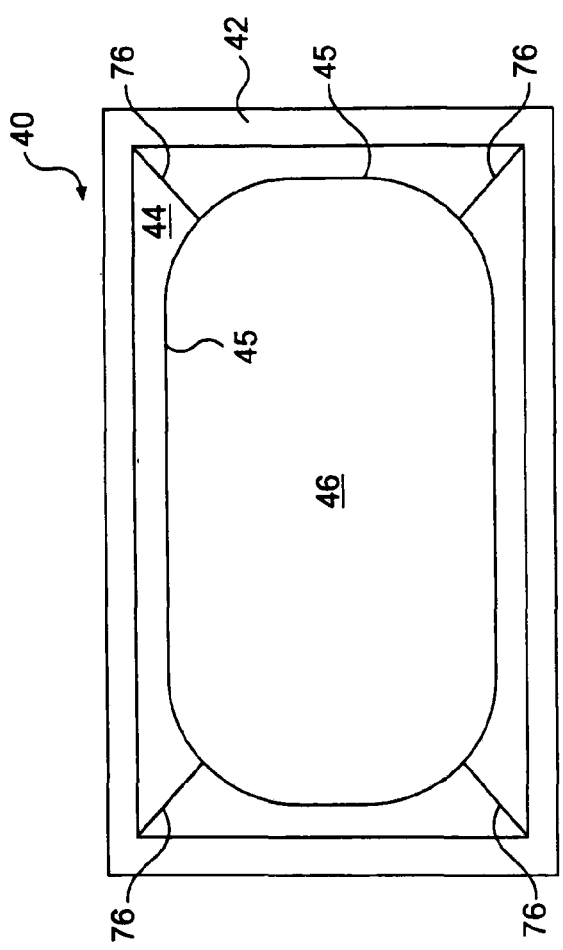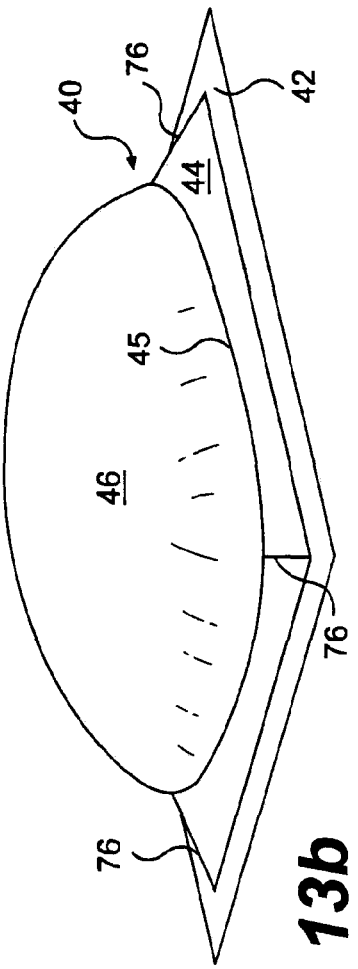
FIG. 13a
FIG. 13b

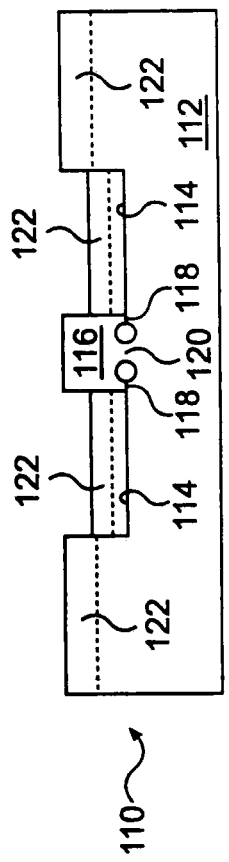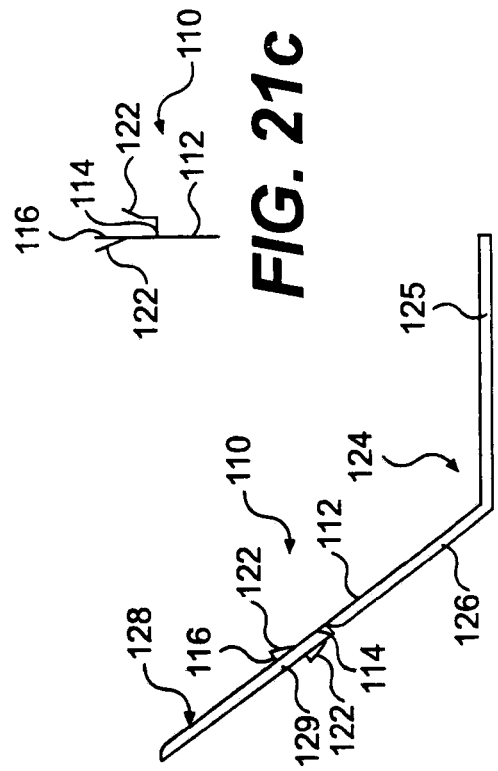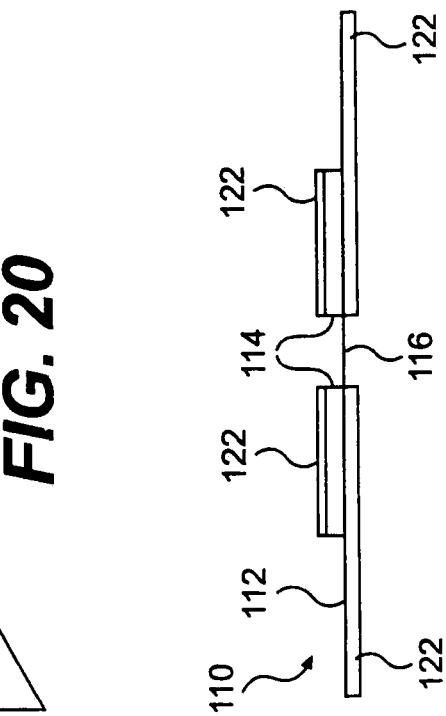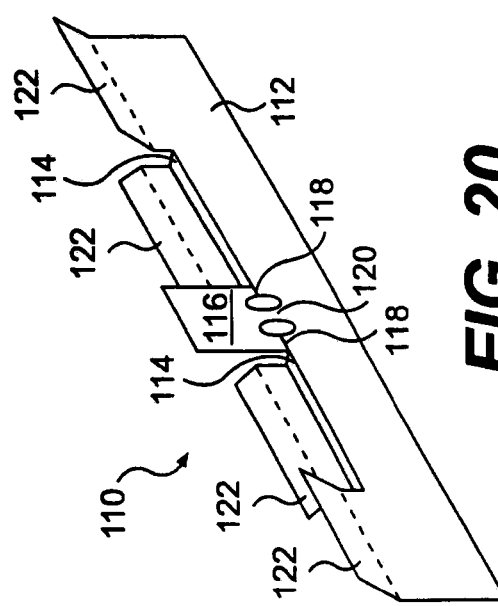

PRESSURE RELIEF DEVICE ASSEMBLIES

RELATED APPLICATIONS

This is a division of U.S. application Ser. No. 10/919,250, filed Aug. 17, 2004, now U.S. Pat. No. 7,784,482, which is a continuation of U.S. application Ser. No. 10/035,229, filed Jan. 4, 2002, now U.S. Pat. No. 6,792,964, which claims the benefit of U.S. provisional application No. 60/259,691 filed Jan. 5, 2001, all of which are incorporated herein by reference.

BACKGROUND OF THE INVENTION

1. Field of the Invention

This invention relates to pressure relief devices, assemblies, and components, as well as methods of forming the same.

2. Background of the Invention

Many types of pressure relief devices exist in the art. These pressure relief devices may include, for example, explosion panels, rupture disks, vacuum supports, and valves. An explosion panel is one type of pressure relief device that is typically used to provide emergency pressure relief under deflagration conditions in an environment such as, for example, a silo or a dust collector. An explosion panel may be subject to both a positive pressure differential and a negative pressure differential. In a positive pressure differential, the pressure within the environment is greater than the external pressure. In a negative pressure differential, the external pressure is greater than the pressure within the environment. In most circumstances, it is desirable for the explosion panel to open when exposed to a predetermined positive pressure differential and to withstand a negative pressure differential.

Various efforts have been made to improve the vacuum resistance of explosion panels. For example, the explosion panel may be shaped to provide a greater resistance to a negative pressure differential than a positive pressure differential. This may be accomplished by forming the explosion panel with a domed shape and exposing the concave surface to the pressure within the environment. This configuration provides greater structural integrity under negative pressure differentials than under positive pressure differentials. Thus, the explosion panel may be configured to open when subject to a predetermined positive pressure differential yet be able to withstand a greater negative pressure differential.

In another method of improving vacuum resistance, a separate "vacuum support" may be included with the explosion panel assembly. This vacuum support may be attached to the concave side of the explosion panel to improve the vacuum resistance. However, an explosion panel should open quickly and completely in response to the predetermined positive pressure differential. In many cases, the additional weight of a vacuum support will inhibit the ability of the explosion panel to quickly and completely open. In addition, the inclusion of a vacuum support may increase the costs associated with manufacturing the explosion panel.

To minimize explosion panel mass, designs that do not require a vacuum support are desirable. Higher mass vents will be less responsive to a dynamic pressure rise. International Standards may limit the mass permitted; NFPA 68 has a mass limit of 2 ½ pounds per square foot. Alternatively, standards may require that 'vent efficiency' be experimentally determined resulting in a greater vent area being required for designs that are lower in efficiency. Higher mass typically results in lower vent efficiency.

Various methods may be used to control the predetermined positive pressure differential at which the explosion panel will open. For example, a series of slits may be cut into the explosion panel to define a series of "tabs." The slits may be cut into the domed section of the explosion panel or the flange section of the explosion panel. These tabs are configured to fail in tension when the explosion panel experiences the predetermined positive pressure differential. The number and size of the tabs will control the pressure differential at which the explosion panel will open. Accordingly, the slits must be carefully cut to ensure that the resulting tab has the appropriate size.

These slits may, however, reduce the vacuum resistance of the explosion panel. When the slits are cut into the explosion panel, the structural integrity of the explosion panel is weakened. Thus, the explosion panel may fail in the area of the slits when exposed to a negative pressure differential. Even if the explosion panel is exposed to a negative pressure differential that does not cause the panel to fail, repeated pressure cycles may fatigue the tabs and thereby alter the pressure differential at which the explosion panel will open.

The pressure differential at which the explosion panel will open may also be controlled by securing the explosion panel to the environment with plastic bolts. The plastic bolts are configured to break when the explosion panel is subject to the predetermined pressure differential. However, the operating conditions of the plastic bolts have a direct impact on the material strength of the bolt. Varying climate conditions may alter the material strength of the plastic bolts and, thus, the pressure differential at which the explosion panel will open. A plastic bolt may also fail at a much higher load under dynamic deflagration venting conditions making prediction of behavior unreliable.

When a pressure relief device, such as, for example, a rupture disk, an explosion panel, or a vacuum support, is exposed to the predetermined pressure differential, a portion of the pressure relief device will typically tear to create an opening. Safety considerations dictate that the opening material should remain attached to the nest of the pressure relief device, instead of fragmenting. To prevent fragmentation, the pressure relief devices typically include an unweakened hinge area. When the pressure relief device opens, the unweakened hinge area prevents fragmentation of the pressure relief device. However, when the pressure relief device experiences a pressure differential that is significantly greater than the predetermined opening pressure differential or a sustained turbulent flow, the hinge area has a tendency to tear, thereby allowing the pressure relief device to fragment.

There is a need in the industry for a pressure relief device that is capable of withstanding vacuum pressure, has a low mass and therefore improved dynamic performance, that will release at the predetermined pressure regardless of the operating environment in which it is placed, that is resistant to operating pressure cycles, and opens without fragmentation. Different aspects of the present invention provide a solution to each of these identified problems.

SUMMARY OF THE INVENTION

Accordingly, the present invention is directed to pressure relief devices, assemblies, and components that obviate one or more of the limitations and disadvantages of prior art pressure relief systems. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

In accordance with one aspect, the present invention is directed to a pressure relief device that includes a substantially flat flange section that has a plurality of openings and that defines a plane. The pressure relief device also includes a domed section that is connected to the flange section and has a transitional line that defines a change in the shape of the domed section. The transitional line is disposed outside of the plane defined by the flange section.

The present invention is further directed to a pressure relief device that includes a substantially flat flange section that has a plurality of openings. A domed section is joined with the flange section and has a concave surface and convex surface. The domed section includes a transitional line that defines a change in the shape of the domed section. A plurality of notches are disposed in the domed section adjacent the transitional line.

The present invention is still further directed to a pressure relief device that includes a substantially flat flange section that has a rectangular shape and a plurality of openings. A domed section is joined with the flange section and has a transitional line extending along the perimeter of the domed section. The transitional line defines a change in the shape of the domed section and forms a circle in the domed section.

The present invention is also directed to a pressure relief assembly that includes a frame and a pressure relief device. The pressure relief device includes a substantially flat flange section configured to engage the frame. The flange section defines a plane and has a plurality of openings. A domed section is joined with the flange section and has a transitional line that defines a change in the shape of the domed section. The transitional line is disposed outside of the plane defined by the flange section. A plurality of fasteners are disposable through one of the plurality of openings in the flange to secure the pressure relief device to the frame.

According to another aspect, the present invention is directed to a pressure relief device that includes a first structure having a substantially flat flange section and a projection extending from the flange section. The pressure relief device also includes a second structure having a domed shape and an outer edge. A bracket having a body portion is configured to be securely engaged with the projection of the first structure. The bracket further includes a support configured to engage the outer edge of the second structure.

The present invention is also directed to a method of making a pressure relief device. A pressure relief device having a substantially flat flange section and a domed section is formed. The pressure relief device is separated into a first structure having the flat flange and a second structure having at least a portion of the domed section. A bracket having a support is secured to the first structure. The second structure is engaged with the support of the bracket.

According to yet another aspect, the present invention is directed to a pressure relief device that includes a substantially flat flange section. A domed section is connected to the substantially flat flange section. A line of weakness is formed in the domed section. The line of weakness extends around a portion of the dome and terminates in two end points. A stress distribution feature is disposed substantially transversely to the line of weakness at each of the two end points of the line of weakness.

According to still another aspect, the present invention is directed to a fastener for engaging a pressure relief device with a frame. The fastener includes a body portion configured to engage the frame. A head portion has an opening that is configured to receive the body portion and a contact surface that is configured to engage the pressure relief device. A wire connects the body portion to the head portion. The wire is configured to break and release the head portion when a predetermined force is exerted on the head portion.

The present invention is further directed to a pressure relief assembly having a frame. A pressure relief device having a flange configured to engage the frame is provided. The flange includes at least one opening. A fastener having a body portion and a head portion is provided. The body portion is fixably connected to the frame and has a central opening. A head portion having an opening engageable with the body portion is provided to secure the pressure relief device to the frame. A wire connects the body portion to the head portion and is configured to break and release the head portion when the flange exerts a predetermined force on the head portion.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

FIG. 10b is a cross-sectional view taken along the line BB in FIG. 10a.

FIG. 10c is a cross-sectional view taken along the line CC in FIG. 10a.

FIG. 13a is a top plan view of an explosion panel in accordance with another exemplary embodiment of the present invention.

FIG. 13b is a pictorial representation of the explosion panel of FIG. 13a.

FIG. 14b is a cross-sectional view taken along the line AA in FIG. 14a.

FIG. 15b is a cross-sectional view taken along the line AA in FIG. 15a.

FIG. 16b is a cross-sectional view taken along the line AA in FIG. 16a.

FIG. 18b is a bottom view of a head portion of the fastener of FIG. 18a.

FIG. 18c is a top view of a body portion of the fastener of FIG. 18a.

FIG. 20 is a pictorial representation of a bracket in accordance with an exemplary embodiment of the present invention.

FIG. 21a is a front view of the bracket of FIG. 20.

FIG. 21b is a top view of the bracket of FIG. 20.

FIG. 21c is a side view of the bracket of FIG. 20.

FIG. 22 is a cross-sectional view of a bracket installed on a pressure relief device in accordance with an embodiment of the present invention.

DETAILED DESCRIPTION

Reference will now be made in detail to the present preferred embodiments of the invention, examples of which are illustrated in the accompanying drawings. Wherever possible, the same reference numbers will be used throughout the drawings to refer to the same or like parts.

One aspect of the present invention has application in all types of pressure relief devices. Such devices include, but are not limited to, rupture disks, explosion panels, and vacuum supports. In this respect, the present invention is directed to a method of reducing the likelihood of fragmentation in such a pressure relief device. This reduced fragmentation potential is achieved by increasing the area over which the opening stresses are applied when the pressure relief device is activated.

Figure 1:
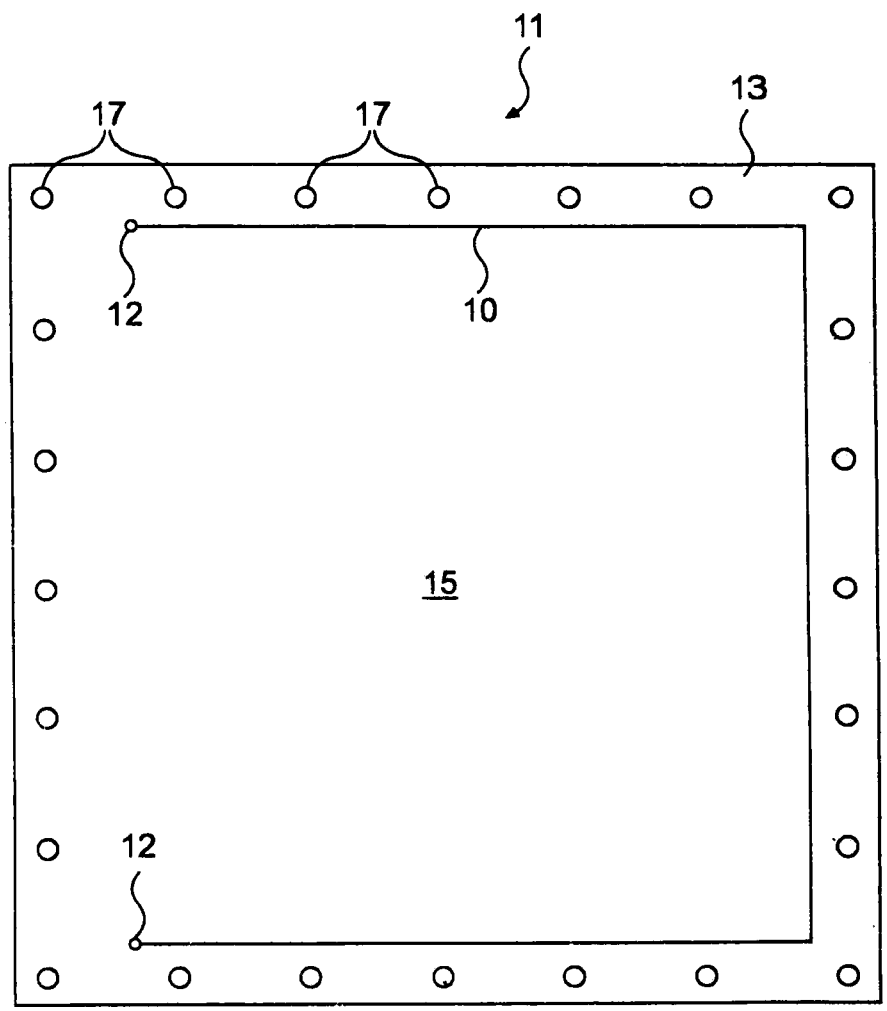
FIG. 1 is a top plan view of a prior art explosion panel.

An exemplary explosion panel is illustrated in FIG. 1 and is designated generally by reference number 11. As shown, explosion panel 11 includes a flange 13 and a central section 15. Flange 13 may have a square shape as illustrated in the exemplary embodiment of FIG. 1. Alternatively, flange 13 may be any other shape commonly used in an explosion panel, such as, for example, rectangular, triangular, trapezoidal, or circular.

Flange 13 may include a plurality of openings 17. Openings 17 may be spaced around flange 13. Each opening 17 may be configured to receive a fastener, such as, for example a bolt. A plurality of fasteners may be disposed in openings 17 to secure explosion panel to a structure, such as, for example, a frame.

Explosion panel 11 may be secured to a structure so that central section 15 is exposed to an enclosed environment that may potentially experience an increased pressure condition. For example, explosion panel 11 may be engaged with a silo or a dust collector. Explosion panel 11 may be configured such that central section 15 will open to create a vent path when the pressure within the enclosed environment exceeds the external pressure by a predetermined limit.

As also shown in FIG. 1, a line of weakness 10 may be disposed on explosion panel 11. Line of weakness 10 may extend along a portion of the perimeter of explosion panel 11 and terminate in two end points 12. Line of weakness 10 may be, for example, a slit or a score line. Line of weakness 10 is configured such that explosion panel 11 will open, or tear in the case of a score line, along line of weakness 10 when explosion panel 11 is exposed to a predetermined pressure differential. In the example of a score line, for example, the width and depth of line of weakness 10 may be altered to change the predetermined pressure differential at which explosion panel 11 will open. In the case of a slit, line of weakness 10 may be intermittent. The spacing of the slit interval may be altered to control the predetermined differential pressure at which the explosion panel will open.

As described in greater detail below, central section 15 of explosion panel 11 may have a domed shape with concave surface and a convex surface. Line of weakness 10 may be formed in either the concave surface or the convex surface or be a slit connecting both surfaces. It should also be noted that line of weakness 10 may be in the flange section 13 of explosion panel 11 or line of weakness 10 may be disposed between flange section 13 and central section 15.

Thus, when the pressure of the fluid within the environment exceeds the external pressure by the predetermined level, the resulting force on explosion panel 11 will cause the material of the explosion panel to open along line of weakness 10. The continued force of the fluid on explosion panel 11 and the force created by fluid escaping through the opening in central section 15 may cause the explosion panel to continue to open beyond line of weakness 10 to thereby increase the size of the opening.

As shown in FIG. 1, line of weakness 10 does not typically extend along the entire perimeter of explosion panel 11. A section of explosion panel 11, commonly referred to as the hinge, may be left without a line of weakness. It is expected that the propagation of the vent opening will stop at end points 12 and the explosion panel material will bend along the hinge area. Each end point 12 may include a small hole configured to distribute the stresses of the opening panel to prevent the material from further tearing at either end point 12. Thus, the hinge area may prevent the explosion panel from fragmenting.

In certain circumstances, however, the opening of explosion panel 11 may be violent enough to cause the material to tear between the two end points 12. This tear may allow central section 15 to fragment from the remainder of explosion panel 11. In other words, explosion panel 11 may experience certain conditions that will cause a portion of the explosion panel to be released into the flow of escaping fluid. The release or fragmentation of any portion of explosion panel 11 may pose a potential safety hazard.

In accordance with the present invention, the explosion panel may include a stress distribution feature. Stress distribution feature may extend substantially transversely to the line of weakness at each of the two end points of the line of weakness. As used in the present disclosure, the term "transversely" is used in its broadest sense to mean laying across the path of the line of weakness at any angle.

Figure 2:
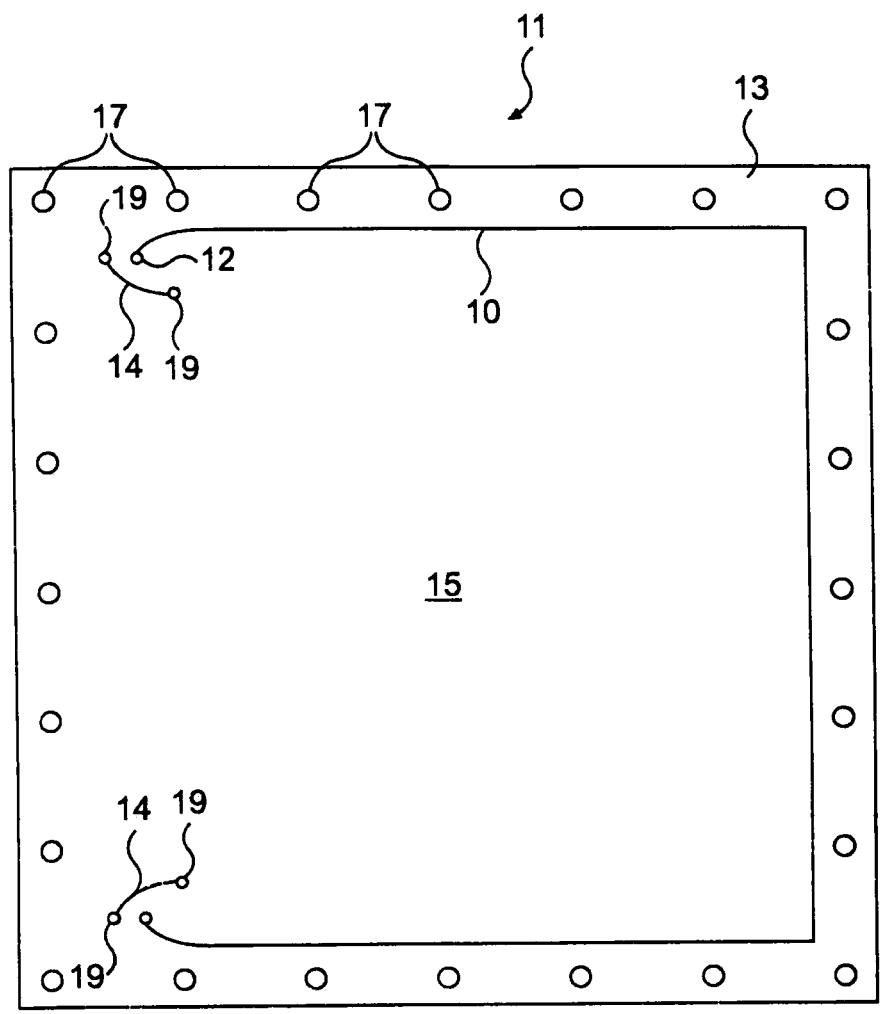
FIG. 2 is a top plan view of an explosion panel in accordance with an exemplary embodiment of the present invention.

As illustrated in FIG. 2, a stress distribution feature 14 is disposed transversely to line of weakness 10 at each end point 12. Each stress distribution feature 14 may be any feature configured to distribute stress. For example, each stress distribution feature may be a slit, a score line, or a raised ridge that protrudes from either the concave of the convex surface of explosion panel 11.

As shown in FIG. 2, stress distribution feature 14 may be slightly curved and have a "smiley face" configuration. It should be noted, however, that stress distribution feature 14 may be linear, have one or more linear segments, one or more curved segments, or a combination of linear and curved segments. It is further noted that stress distribution feature 14 may have various radii of curvature and/or may be oriented at various angles relative to line of weakness 10.

Stress distribution feature 14 may prevent the fragmentation of explosion panel 11. If the opening of explosion panel 11 is violent enough to cause a tear to propagate from one or both of endpoints 12, each tear will encounter one stress distribution feature 14. Stress distribution feature 14 provides a line of weaker material disposed in a direction transverse to line of weakness 10 and the expected direction of material tearing. When the material tear reaches stress distribution feature 14, it is expected that any continued tearing will follow the direction of weaker material of stress distribution feature 14. Thus, any continued tearing of the material of explosion panel 11 will likely be in a direction that is transverse to the direction of line of weakness 10. In this manner, stress distribution feature may divert or deflect the direction of material tearing. Thus, stress distribution feature 14 may prevent the tear from propagating across the hinge area. By preventing the two tears from meeting or by preventing one tear from propagating across the hinge area, stress distribution feature 14 may prevent explosion panel 11 from fragmenting.

In addition, a small hole 19 may be disposed at either end of each stress distribution feature 14. Each small hole 19 may prevent the material of the explosion panel 11 from tearing past the end of the stress distribution feature. If the force of the fluid on explosion panel 11 causes the material of explosion panel 11 to tear along stress distribution feature 14, the tear may eventually reach the ends of stress distribution feature 14. Small hole 19 at each end of stress distribution feature 14 will distribute the tearing stresses over the circumference of the small hole. Thus, greater stresses will be required to continue the material tearing past the small hole. If the stresses are not great enough to continue tearing the material, the tear will end at the hole, thereby preventing fragmentation of explosion panel 11.

Figure 3:
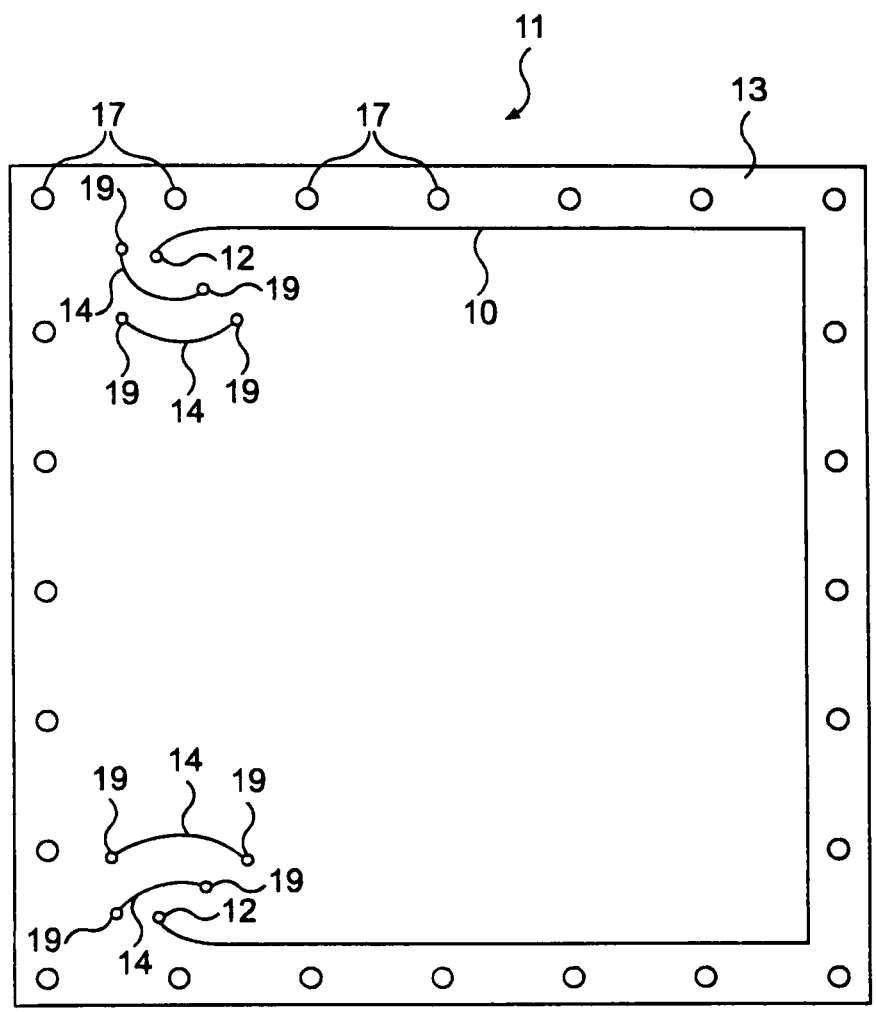
FIG. 3 is a top plan view of an explosion panel in accordance with an exemplary embodiment of the present invention.

The present invention contemplates that any number of stress distribution features may be used in combination to achieve the desired objective of diverting stress and reducing the likelihood of fragmentation upon opening of the pressure relief device. In the exemplary embodiment of FIG. 3, a pair of stress distribution features 14 are disposed at each end point 12 of line of weakness 10.

Figure 4:
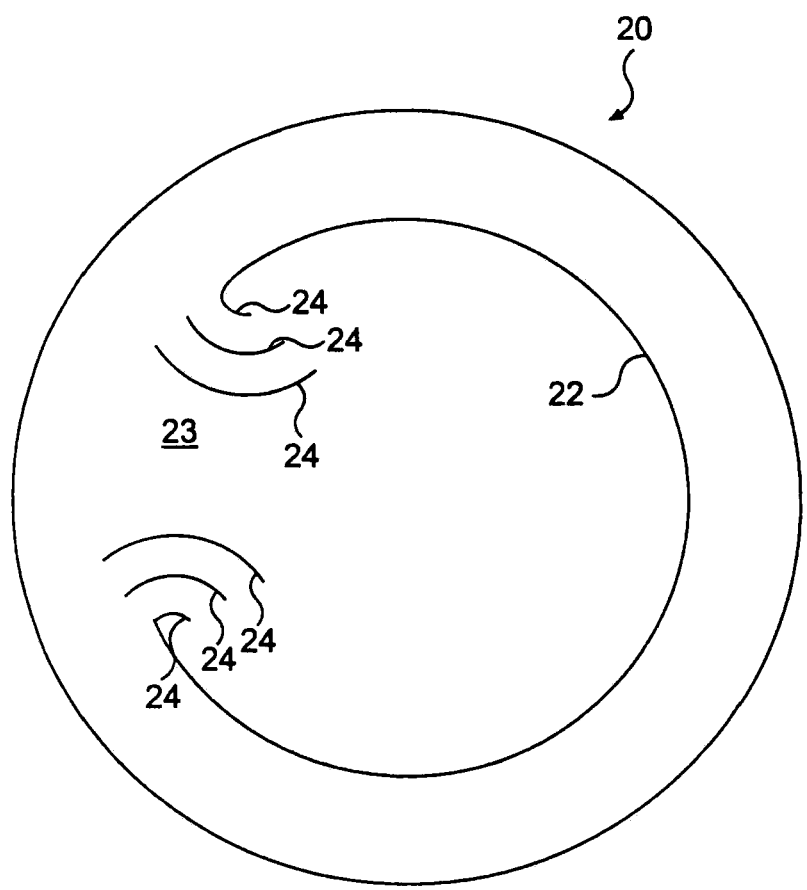
FIG. 4 is a top plan view of an explosion panel in accordance with an exemplary embodiment of the present invention.

The present invention further contemplates that the concept of the stress distribution feature may be incorporated into other types of pressure relief devices. For example, as illustrated in FIG. 4, a rupture disk 20 may include one or more stress distribution features 24. As one skilled in the art will recognize, rupture disks often include a score line 22 and a hinge area 23. As shown, stress distribution features 24 may be disposed adjacent the endpoints of score line 22. As described in connection with the explosion panel above, each stress distribution feature may divert or deflect the direction of tearing to prevent the fragmentation of rupture disk 20. Stress distribution feature 24 and score line 22 may be either slits or scores, or a combination of slits and scores.

Comparative testing of pressure relief devices with and without the stress distribution features of the present invention illustrate that the stress distribution features of the present invention are more likely to prevent fragmentation of the pressure relief device. For comparison purposes, a pressure relief device without a stress distribution feature was burst at 4 psi and a similar pressure relief device that included a stress distribution feature was burst at 25 psi. In spite of the increased pressure differential on the pressure relief device that included the stress distribution feature, the remaining hinge area on the pressure relief device with the stress distribution feature was greater than the remaining hinge area on the pressure relief device without the stress distribution features. Thus, the stress distribution feature successfully diverted the direction of material tearing.

Thus, incorporating a stress distribution feature of the present invention into a pressure relief device may allow for a smaller hinge area to be used. Because the stress distribution feature deflects any material tearing, the distance between the endpoints of the line of weakness may be reduced without increasing the likelihood of fragmentation. Accordingly, the pressure relief device may open to create a larger vent path through which fluid may escape. The larger vent path translates to a lower flow resistance factor, $K_R$, and an enhanced fluid flow through the activated pressure relief device.

Figure 5:
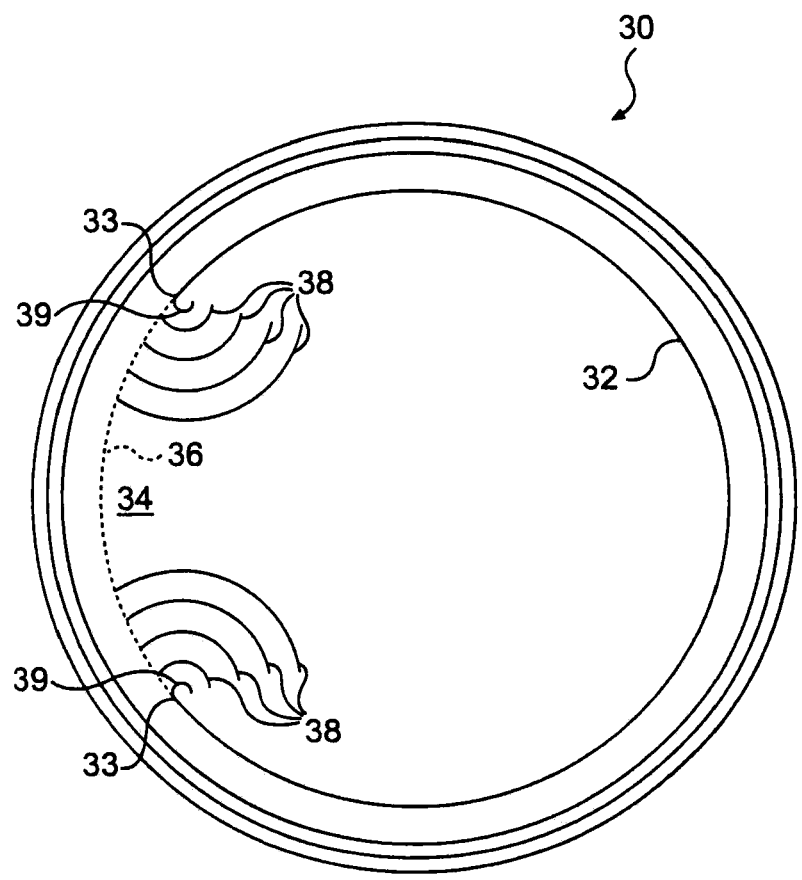
FIG. 5 is a top plan view of a rupture disk in accordance with an exemplary embodiment of the present invention.

As illustrated in FIG. 5, the stress distribution features of the present invention may also be applied to pressure relief assembly components, such as, for example, a vacuum support 30. As shown, vacuum support 30 includes a line of weakness 32, which may be, for example, a score line, that terminates in two endpoints 33. A series of four stress distribution features 38 are disposed at each of the two endpoints 33. In the illustrated exemplary embodiment, stress distribution features 38 have an arcuate, or "smiley face" configuration.

As further shown in FIG. 5, each of the stress distribution features 38 initiates at an imaginary line 36 that would connect the two end points 33 of line of weakness 32 to form a complete circle. The present invention contemplates that the stress distribution features may be disposed on either side of imaginary line 36 or may straddle imaginary line 36. In addition, an additional stress distribution feature 39 may initiate at each endpoint 33 of line of weakness 32. As described above, stress distribution features 38 and 39 will divert or deflect any tearing motion of vacuum support 30 material to a direction transverse to the line of weakness. In this manner, stress distribution features 38 and 39 may prevent vacuum support 38 from fragmenting and allow a shorter distance between end points 33 which provides enhanced opening of the vacuum support.

Another aspect of the present invention has particular application in domed pressure relief devices that have a flange with a square or rectangular shape. These pressure relief devices, and in particular, the corners of these pressure relief devices, are typically susceptible to failure when subject to a negative pressure differential.

In accordance with the present invention, a pressure relief device includes a flange and a domed section. The domed section includes a transitional fine that defines a change in the shape of the domed section. For the purposes of the present disclosure, the phrase "change in the shape of the domed section" includes any distinct modification in the shape of the domed section. For example, when viewed from a cross-sectional perspective, a change in the shape of the domed section may be a change from a linear section to a curved section, a change in the radius of curvature of the domed section, a marked change in the slope of the domed section, or another similar shape change. As described in greater detail below, the domed section may include one or more transitional lines that extend along a portion or the entirety of the domed section.

Figure 6A:
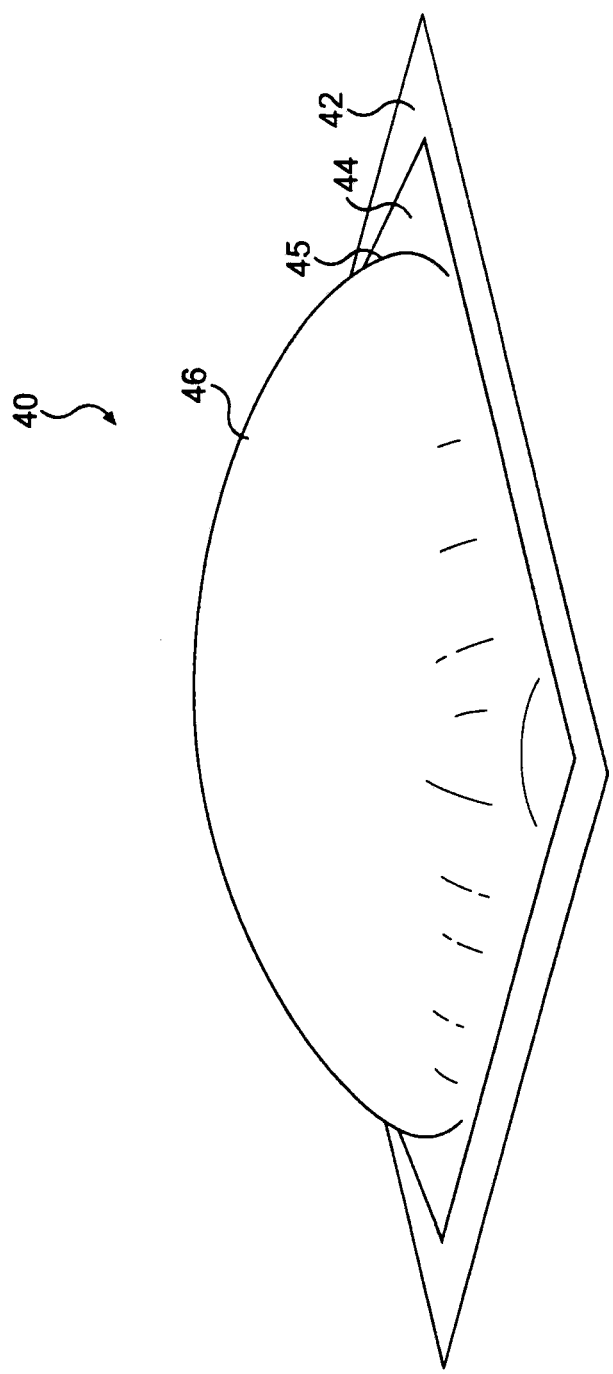
FIG. 6a is a pictorial representation of an explosion panel in accordance with an exemplary embodiment of the present invention.
Figure 6B:
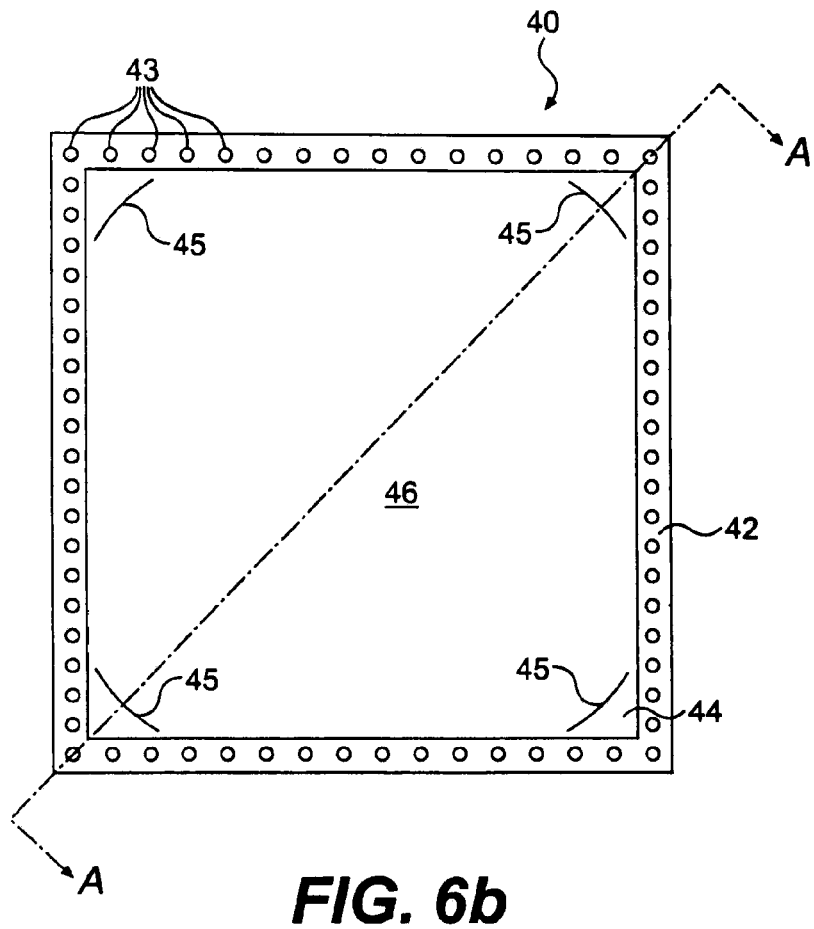
FIG. 6b is a top plan view of an explosion panel in accordance with an exemplary embodiment of the present invention.
Figure 6C:
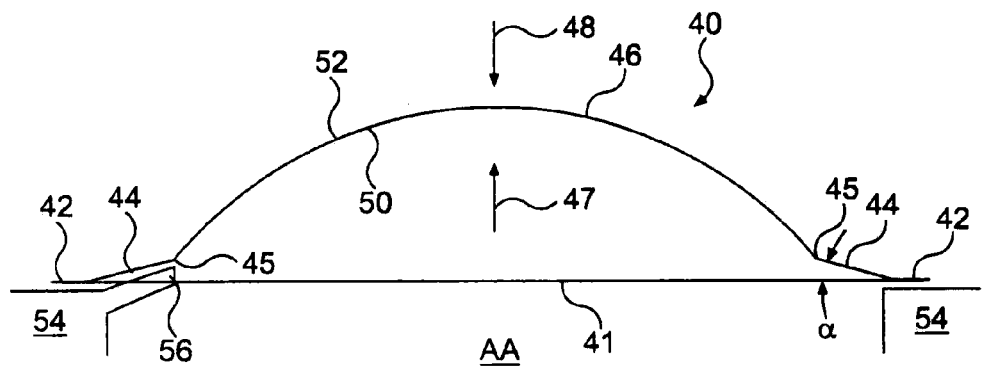
FIG. 6c is a cross-sectional view of the explosion panel of FIG. 6b taken along line AA.

As illustrated in FIGS. 6a-6c, a pressure relief device 40 includes a flange section 42. Flange section 42 may have a rectangular or square shape and define a plane 41. Flange section 42 may also include a series of openings 43 (referring to FIG. 6b) that extend around flange section 42 and allow pressure relief device 40 to be secured to a frame 54 (referring to FIG. 6c) or other suitable support structure.

As further illustrated in FIG. 6c, pressure relief device 40 also includes a domed section 46 that has a concave surface 50 and a convex surface 52. Domed section 46 is joined with flange section 42. Pressure relief device 40 may be secured to frame 54 such that a positive pressure differential exerts a force on central domed section 46 in the direction indicated by arrow 47 and a negative pressure differential exerts a force on central domed section 46 in the direction indicated by arrow 48.

Domed section 46 also includes at least one transitional line 45. Transitional line 45 denotes a change in the shape of domed section 46. In the exemplary embodiment illustrated in FIGS. 6a-6c, domed section 46 includes a series of four transitional lines 45. Each transitional line 45 aligns with a corner of the square shaped flange section 42. When viewed from a top-down perspective, as illustrated in FIG. 6b, each transitional line 45 may be a chamfer (linear section) or a fillet (curved section).

Referring to FIG. 6c, domed section 46 includes a transitional section 44 between flange 42 and transitional line 45. Transitional section 44 may be substantially linear and project at an angle α from plane 41 so that transitional line 45 is disposed outside of plane 41 defined by flange 42. It is contemplated that transitional section 44 may project at any angle α from plane 41, although angle α is preferably between about 20° and 45°. Domed section 46 extends at a greater, or steeper, angle from transitional line 45 to the apex of the dome. It should be noted that transitional section 44 may also have a curved shape and may be constructed to be at least partially below plane 41.

The inclusion of transitional line 45 in each corner of explosion panel 40 improves the ability of the explosion panel to withstand a negative pressure differential (i.e. a force in the direction of arrow 48 in FIG. 6c). When a negative pressure differential is exerted on explosion panel 40, the steeper section domed section 46 transmits the resulting force to the transitional line 45. Transitional section 44, which supports the upper portion of domed section 46, transmits the force to flange section 42 and to frame 54. Thus, transitional line 45 acts as a "bridge" that transmits the compressive force of a negative pressure differential to the supporting frame 54.

In addition, transitional line 45 may facilitate the opening of explosion panel 40. In certain configurations of explosion panel 40, the burst control tabs are located in flange section 42, which is surrounded by a frame on either side. Accordingly, for explosion panel 40 to open, domed section 46 must collapse to allow a part of flange section 42 to withdraw from between the frames. The shallower angle of transitional section 44 provides additional clearance between the steeper portion of domed section 46 and a frame that may be disposed on the outlet side of the explosion panel. The additional clearance provides additional space for the domed section to flex and allow flange section 42 to withdraw from between the supporting frames.

As also shown in FIG. 6c, a tab 56 may extend from frame 54. Tab 56 may be configured to engage domed section 46 at or near transitional line 45 to provide additional support under negative pressure differential conditions. It is contemplated that a series of tabs 56 may be positioned around frame 54 or around domed section 46 to provide support for the upper portion of domed section 46 at a plurality of locations along transitional lines 45.

Figure 7:
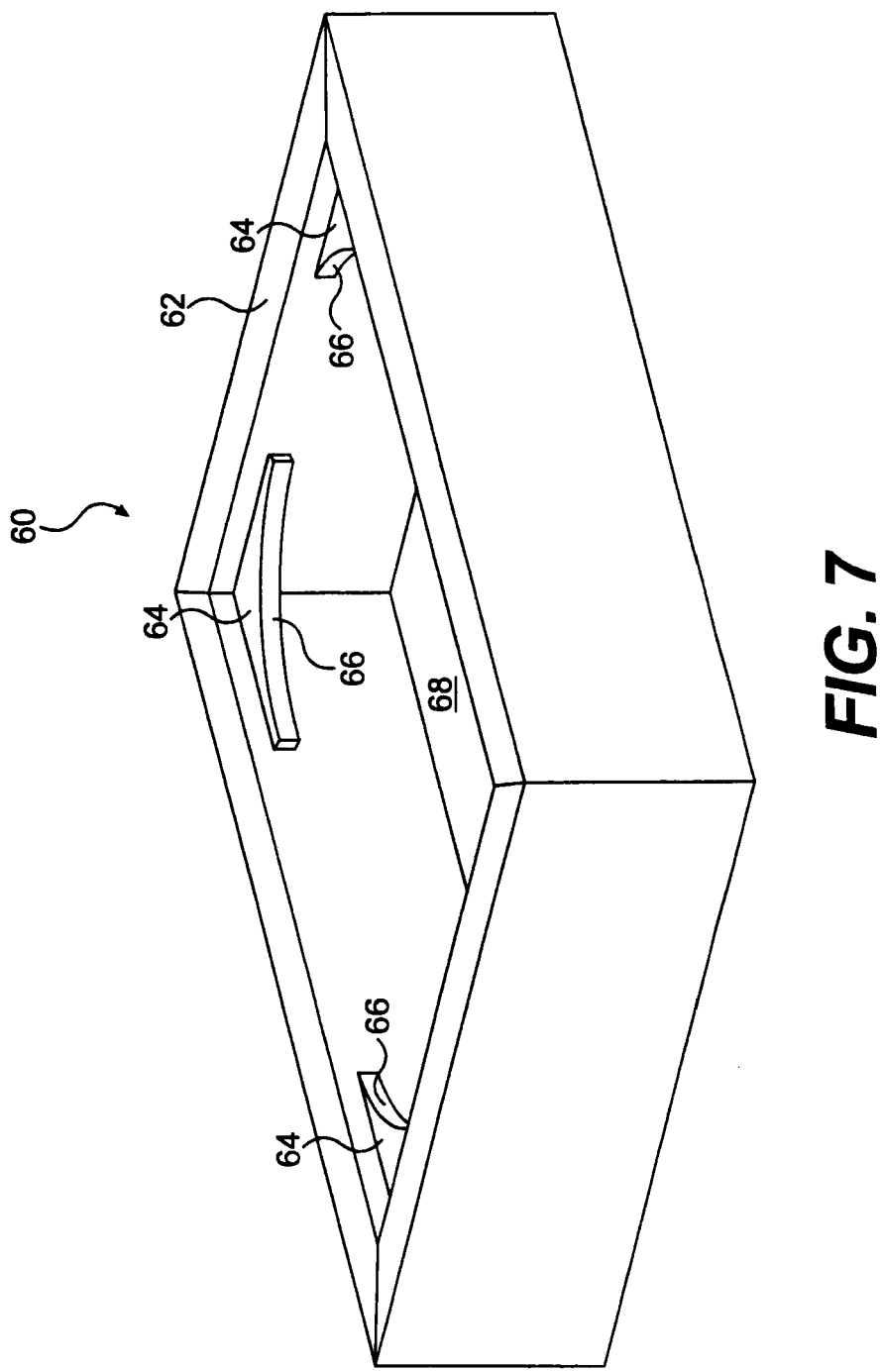
FIG. 7 is a pictorial representation of a forming mold used to make the explosion panel of FIGS. 6a-6c.

A mold 60 for forming an explosion panel 40 is illustrated in FIG. 7. As shown, mold 60 includes a frame 60 that defines an internal cavity 68. A series of supports 64 are disposed around internal cavity 68.

To form the explosion panel, a sheet of metal may be placed across the top of frame 60. Pressure may then be applied to the sheet of metal to deform the metal into internal cavity 68. The depth of internal-cavity 68 may be adjusted to accommodate the crown height of the domed section of the explosion panel. As the metal deforms, the deforming metal at each corner of frame 62 will engage an edge 86 of each support 64. Each edge 66 will form a transitional line 45 in the domed section 46 of explosion panel 40 (referring to FIGS. 6a-6c).

It is contemplated that various configurations of mold 64 and, thus, various configurations of explosion panel 40 will be readily apparent to one skilled in the art as improving the vacuum resistance of the explosion panel. For example, instead of having supports 64 disposed at each corner in the mold, mold may include supports 64 disposed at a selected few of the mold corners. The resulting explosion panel would include transitional lines only at corresponding locations. In addition, the size and shape of each support 64 may be varied to change the shape of the resulting transitional line or lines. For example, the radius of curvature of each support 64 may be varied. Further, the edge 66 of each support 64 may form a substantially straight line. Thus, the resulting explosion panel may have transitional lines of many different configurations in each corner.

Figure 8A:
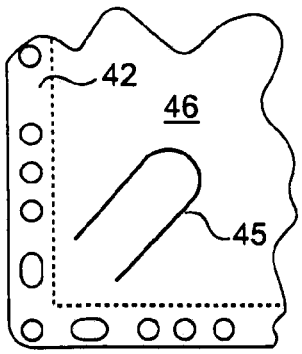
FIGS. 8a-8i are top plan views of the corner sections of an explosion panel in accordance with exemplary embodiments of the present invention.
Figure 8B:
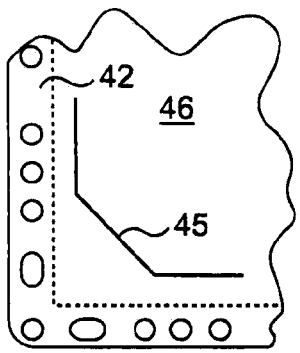
Figure 8C:
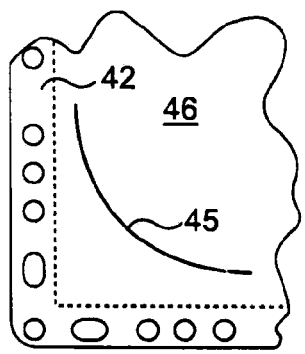
Figure 8D:
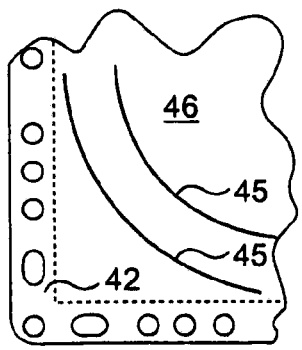
Figure 8E:
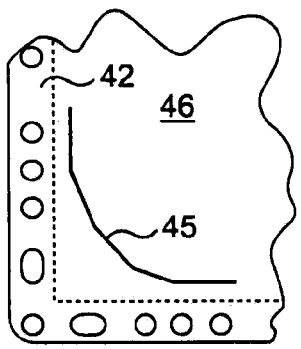
Figure 8F:
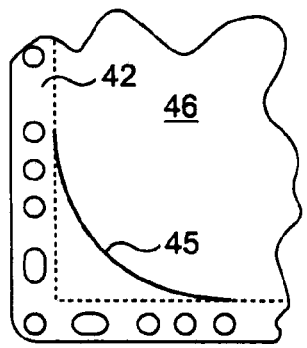
Figure 8G:
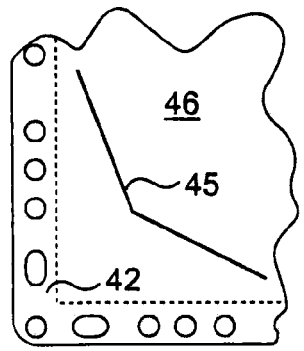
Figure 8H:
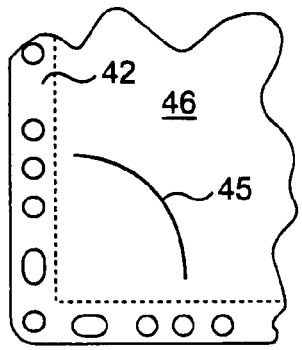
Figure 8I:
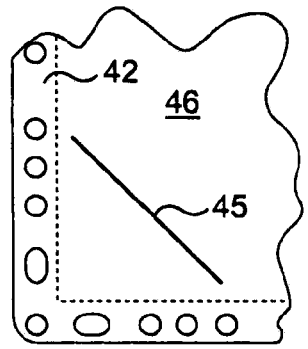

FIGS. 8a-8i illustrate several exemplary embodiments of transitional lines 45. As shown in FIG. 8a, transitional line 45 may have a "U" shape. As shown in FIG. 8b, transitional line 45 may include a series of interconnected linear segments. As shown in FIG. 8c, transitional line 45 may be a curved segment. As shown in FIG. 8d, a pair of transitional lines 45 may be disposed in domed section 46. As shown in FIG. 8e, transitional line 45 may include a plurality of interconnected linear segments. As shown in FIG. 8f, transitional line 45 may be a curved section having endpoints that substantially coincide with the border between flange section 42 and domed section 46. As shown in FIG. 8g, transitional line 45 may be comprised of two interconnected linear segments. As shown in FIG. 8h, transitional line 45 may be a curved segment having a center of curvature opposite to the curved segment illustrated in FIG. 8c. As shown in FIG. 8i transitional line 45 may be a substantially straight segment.

The present invention contemplates that many additional variations in the disclosed transitional line may provide increased support for the explosion panel under a negative pressure differential situation and are considered within the scope of the present invention. For example, the size of the curved segments be varied. In addition, the curved segments may be either centered or not centered with respect to the corners of the flange section. It is further contemplated that multiple curved sections may be placed in parallel to each other in or adjacent to the corners. Similarly, substantially straight segments, or chamfers, may be applied, singularly or in parallel, adjacent to the corners of the flange section.

Other forms of strength-enhancing features may include diagonally oriented features that begin at the panel corners and extend towards the apex of the dome. These diagonal features may develop either a concave or convex facing corner ridge in the explosion panel. It is contemplated that a diagonal ridge feature may intersect the transitional line and may further increase the vacuum strength of the panel. Such ridges may or may not be perpendicular to the transitional line.

The present invention contemplates any transitional line that enhances vacuum support strength by applying a shape modification to the dome profile. These transitional lines may be formed in the plane of the flange section or may be elevated with respect to that plane. Alternatively, the strengthening feature can be formed below the plane of the vent flange.

The present invention further contemplates that the transitional line may extend around the entire perimeter of the explosion panel, instead of being limited to one or more corners of the panel. For example, FIGS. 9 and 10a-10c illustrates an explosion panel 40 that includes a transitional line 45 that extends around the perimeter of domed section 46.

Figure 10A:
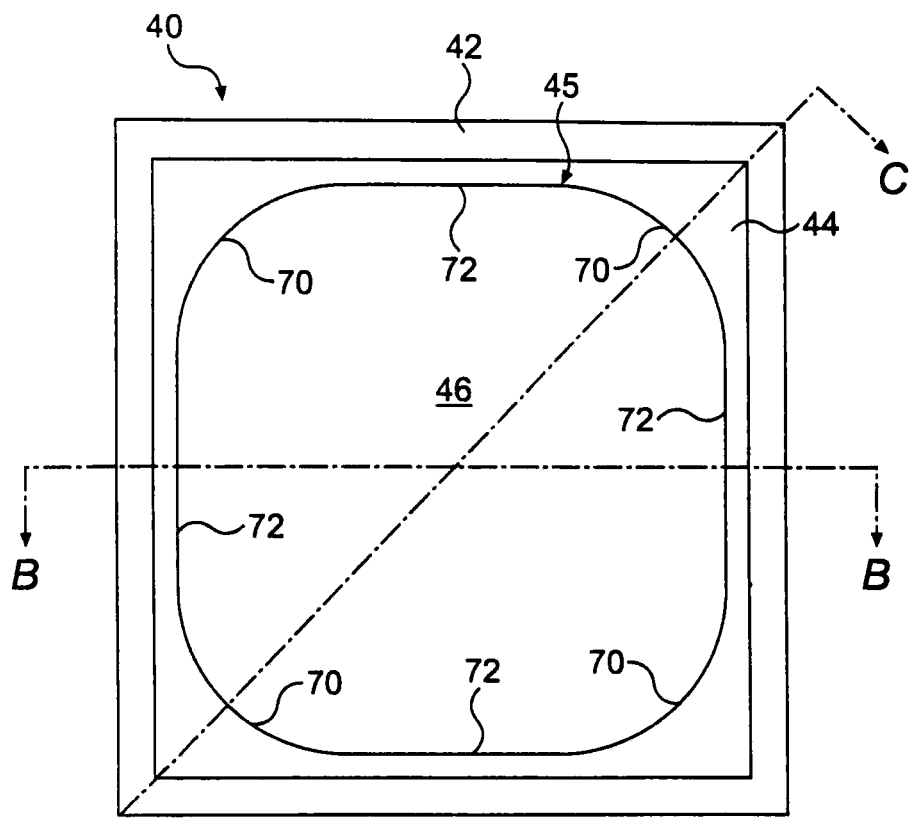
FIG. 10a is a top plan view of the explosion panel of FIG. 9.
Figure 10B:
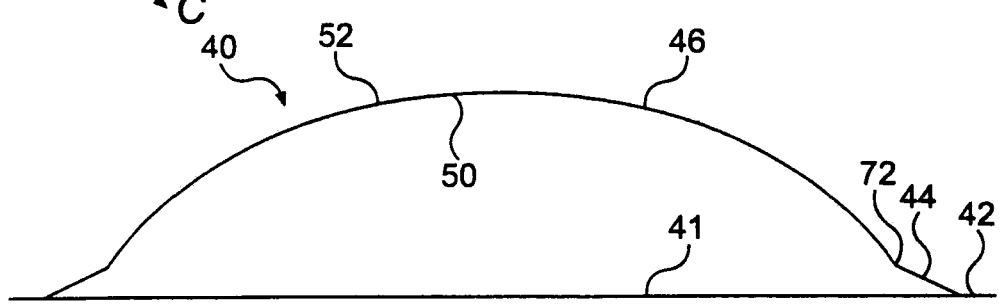
Figure 10C:
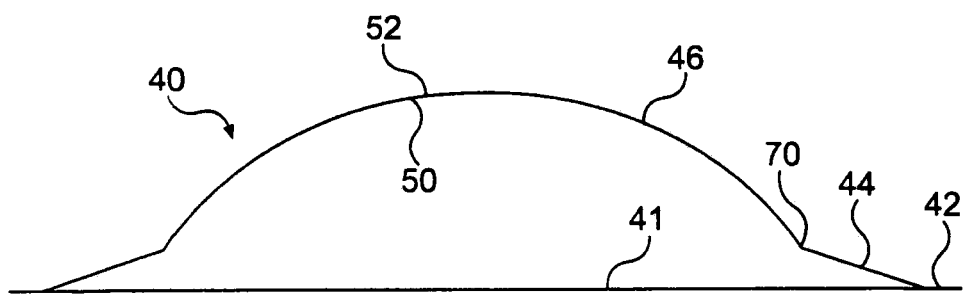

As shown in FIG. 10a, explosion panel 40 has a square-shaped flange section 42. Transitional line 45 includes a series of curved sections 70 connected by a series of straight sections 72. Each of the straight sections 72 may be disposed at equal distances from flange section 42 and each of the curved sections 70 may be disposed at equal distances from the corners of flange section 42. However, the distance between flange section 42 and transitional line 45 will be greater along curved sections 70 than along straight sections 72. Accordingly, as shown in FIGS. 10b and 10c the length of transitional section 44 will be greater in the corners (referring to FIG. 10c) than in the straight sections (referring to FIG. 10b).

Figure 11:
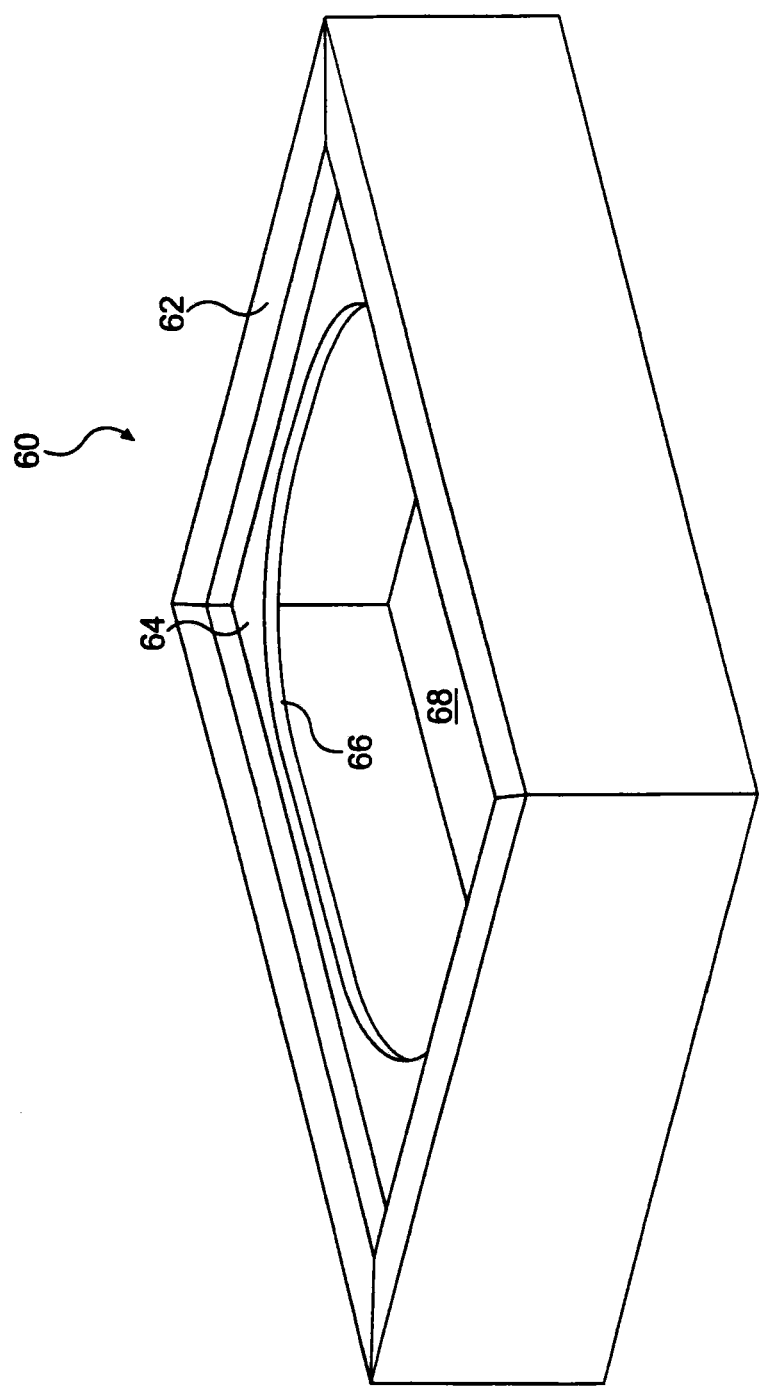
FIG. 11 is a pictorial representation of a forming mold used to make the explosion panel of FIGS. 9 and 10a-10c.
Figure 12A:
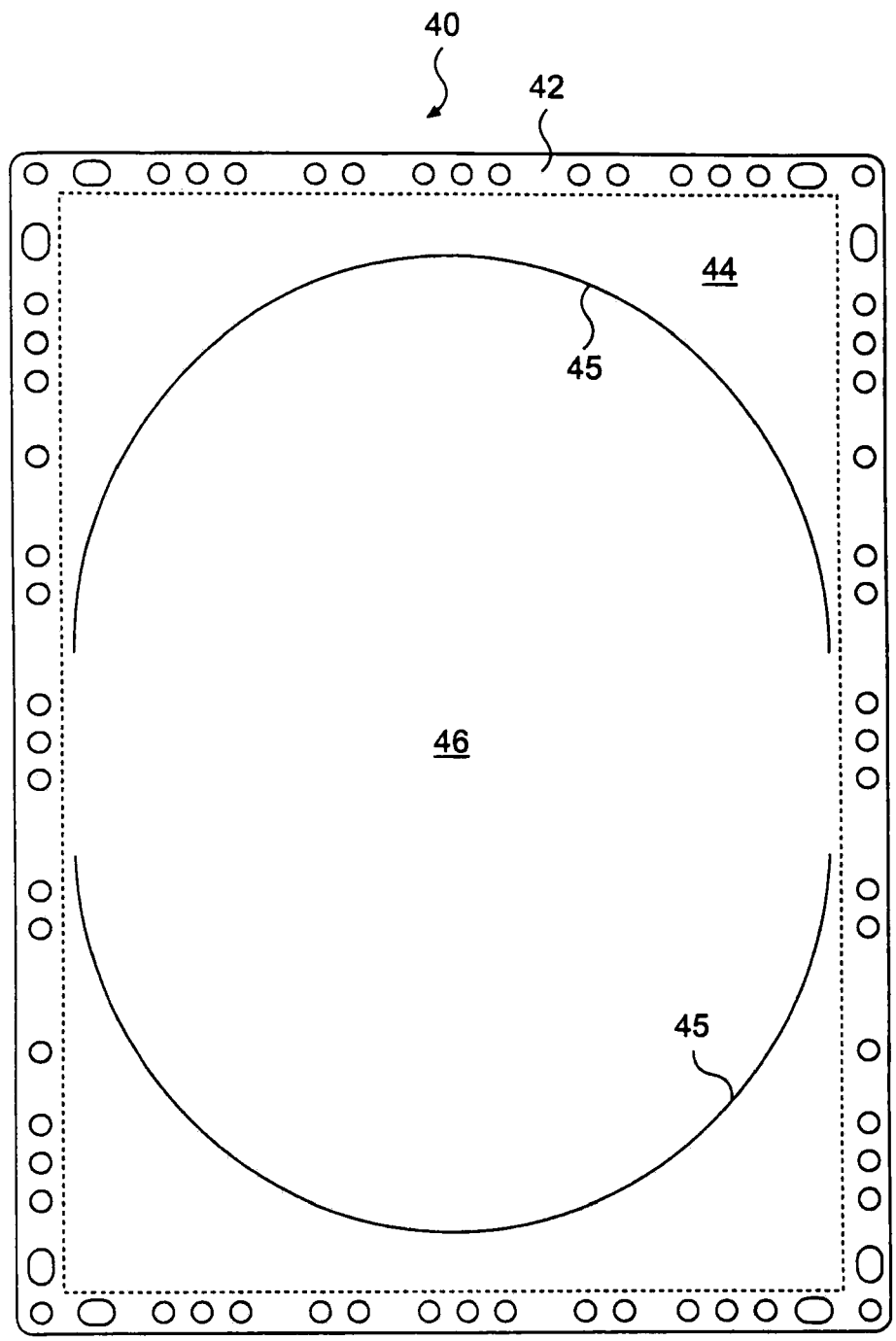
FIGS. 12a-12e are top plan views of an explosion panel in accordance with exemplary embodiments of the present invention.
Figure 12B:
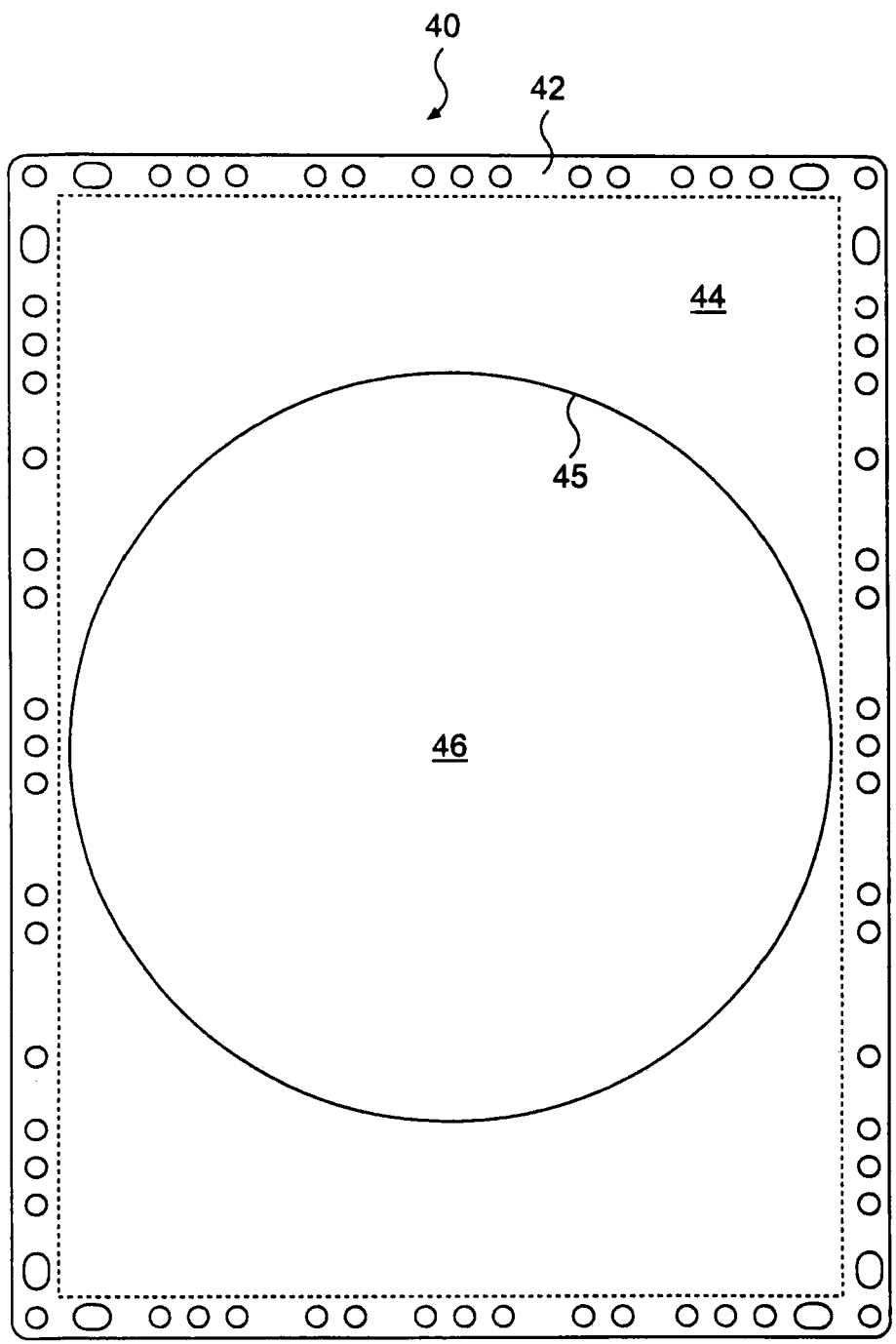
Figure 12C:
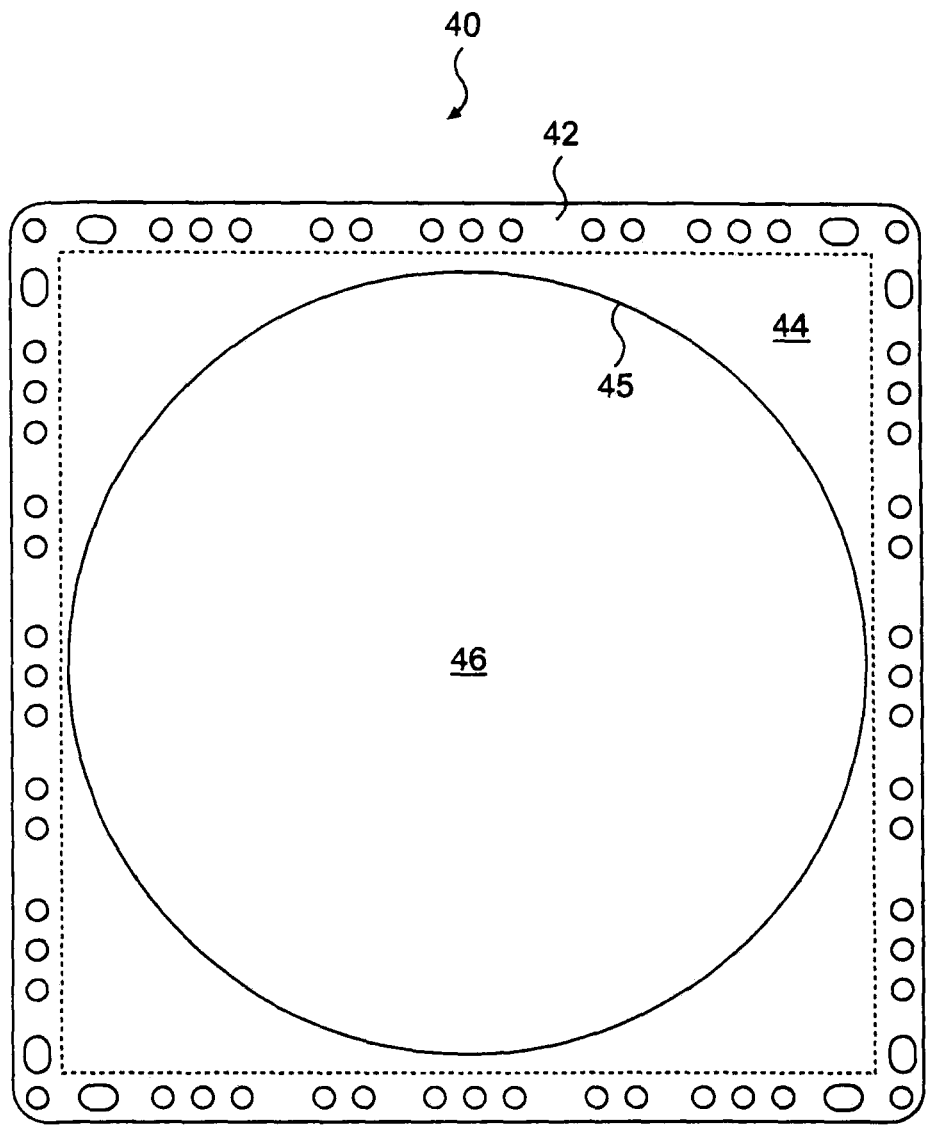
Figure 12D:
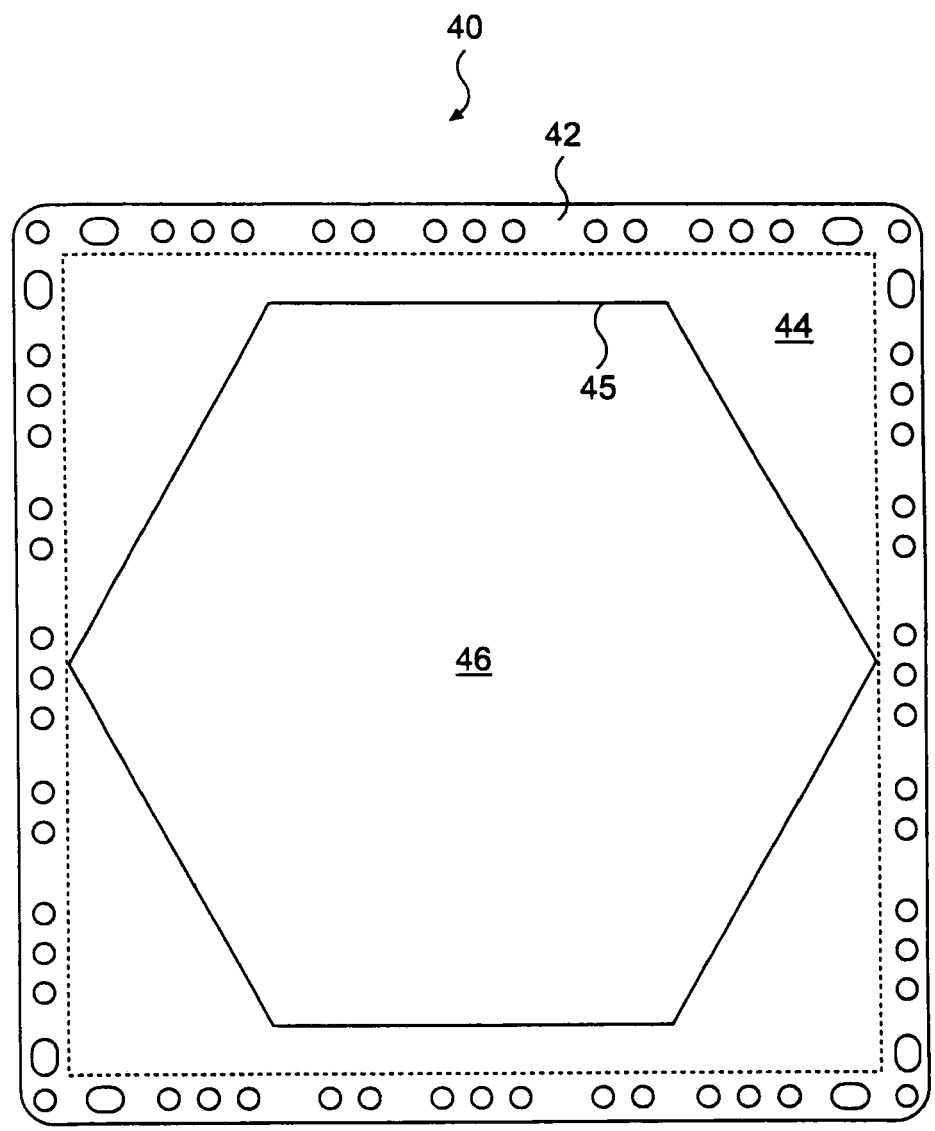
Figure 12E:
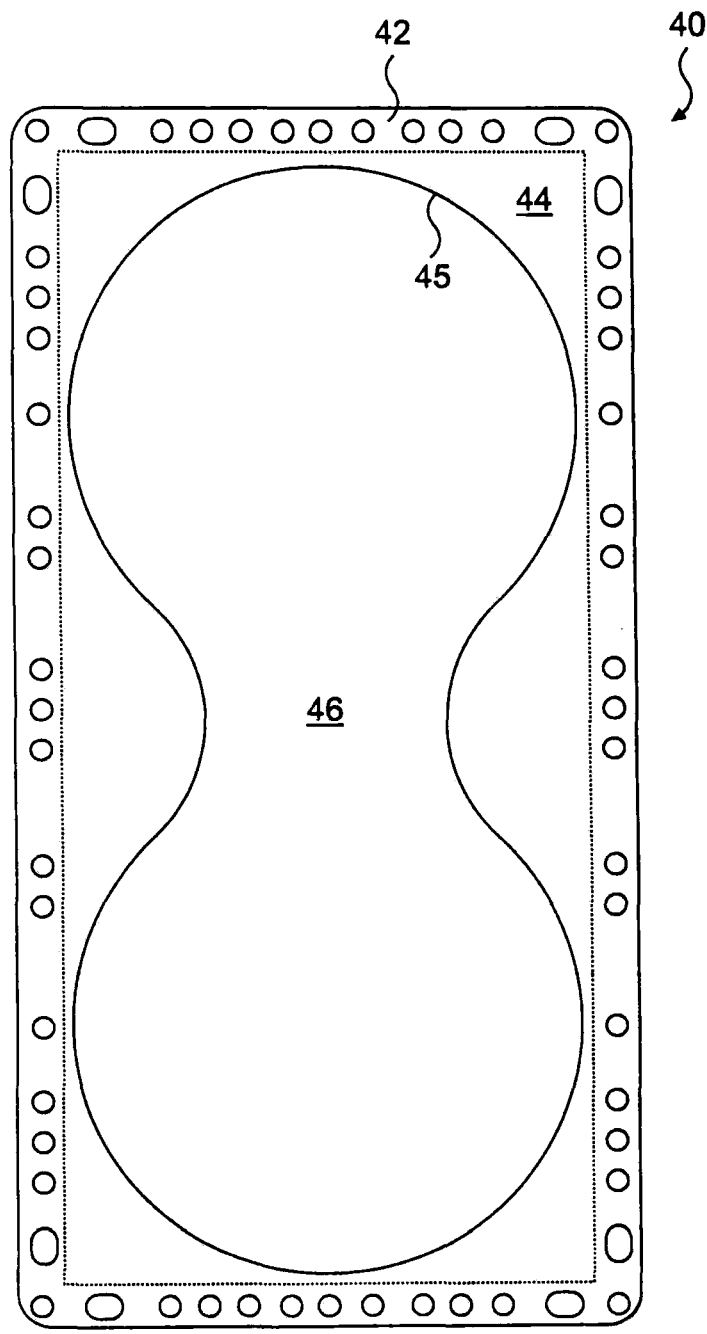

FIG. 11 illustrates a mold 60 configured to form an explosion panel 40 as illustrated in FIGS. 9 and 10a-10c. As shown, edge 66 of support 64 extends along the entire perimeter of frame 62. Thus, when the sheet of metal is deformed into cavity 68, edge 66 will form a transitional line 45 that extends around the perimeter of the domed section.

The extended transitional line will provide additional support for the domed section of the explosion panel when exposed to a negative pressure differential. As described above, the compressive force resulting from the negative pressure differential will be directed through the transitional line to the supporting frame. With the extended transitional line, the additional support will be provided around the entire explosion panel.

The present invention contemplates that many variations of the extended transitional area will be readily apparent to one skilled in the art. Several additional exemplary embodiments of explosion panels having extended transitional lines are illustrated in FIGS. 12a-12e. The explosion panel illustrated in FIG. 12a includes a rectangular flange section 42 and a pair of semi-circular transitional lines 45 that open towards each other. The explosion panel illustrated in FIG. 12b includes a rectangular flange section 42 and a circular transitional line 45. The explosion panel illustrated in FIG. 12c includes a square flange section 42 and a circular transitional line 45. The explosion panel illustrated in FIG. 12d includes a square flange section 42 and a hexagonal transitional line 45. The explosion panel illustrated in FIG. 12b includes a rectangular flange section 42 and "FIG. 8" transitional line 45. It is contemplated that many other variations on the extended transitional line may be readily apparent to one skilled in the art and are considered within the scope of the present invention.

As illustrated in FIGS. 13a and 13b, explosion panel 40 may be formed with a series of ridges 76, or other reinforcing features. Ridges 76 may provide additional support against a force resulting from a negative pressure differential. In the illustrated embodiment, ridges 76 extend from transitional line 45 to each corner of flange section 42. It is contemplated, however, that the explosion panel may include additional reinforcing features around domed section 46.

Figure 14A:
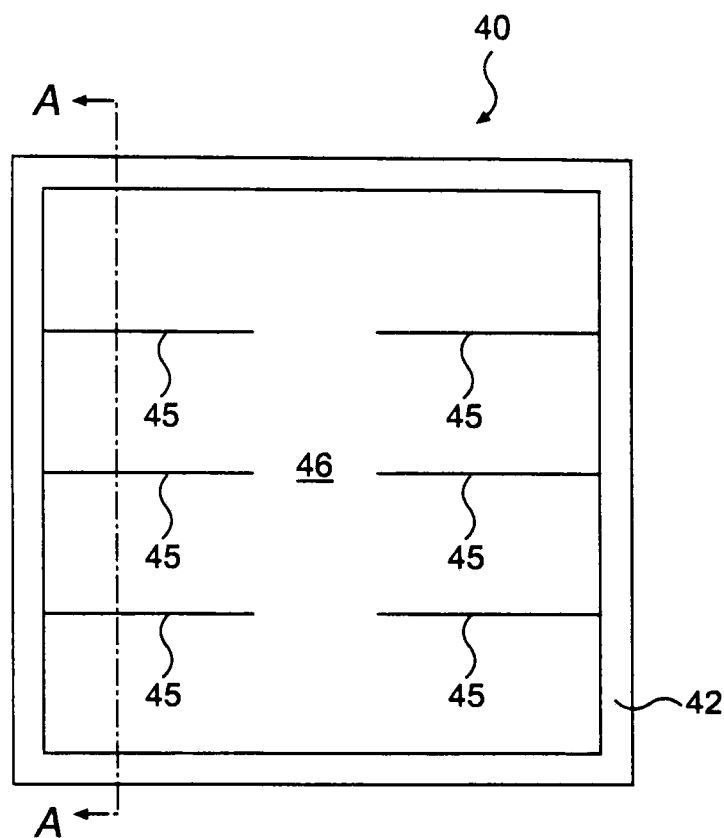
FIG. 14a is a top plan view of an explosion panel in accordance with another exemplary embodiment of the present invention.
Figure 14B:
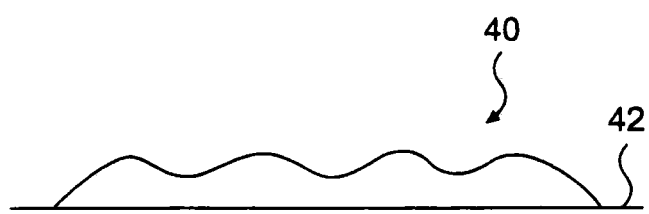
Figure 15A:
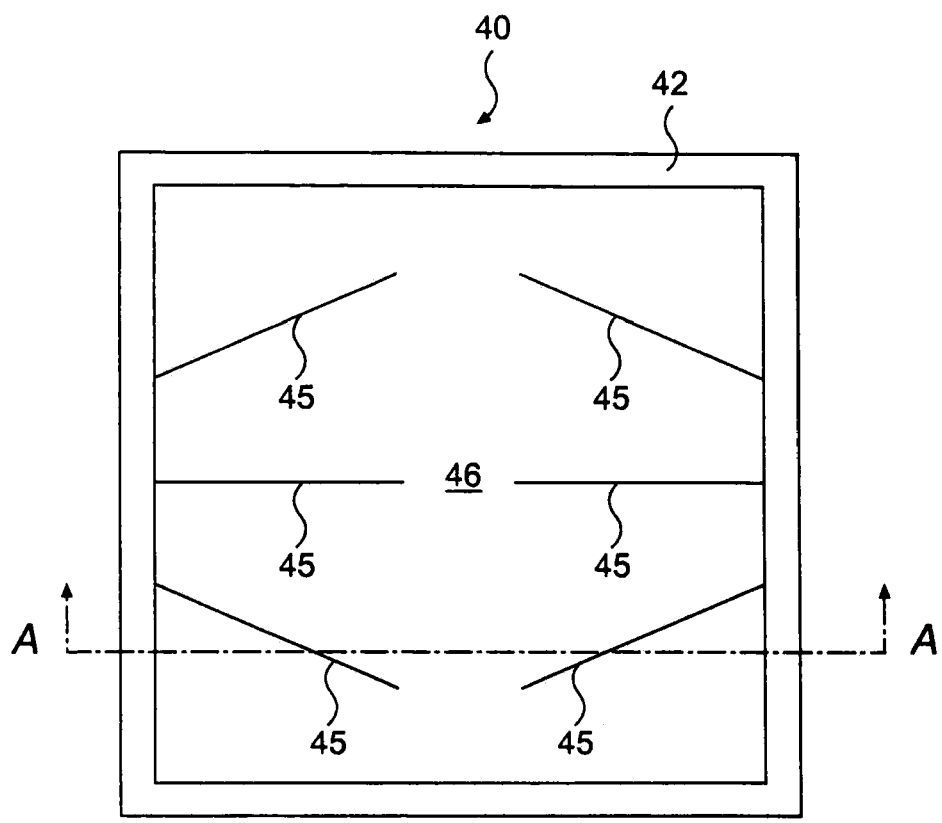
FIG. 15a is a top plan view of an explosion panel in accordance with another exemplary embodiment of the present invention.
Figure 15B:
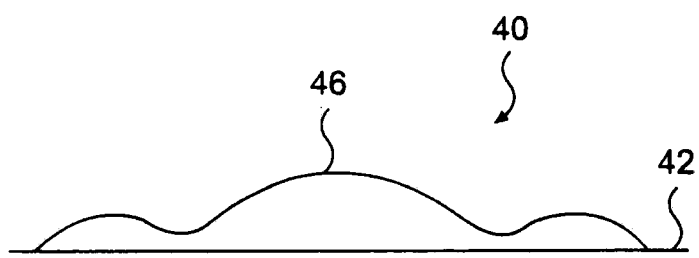
Figure 16A:
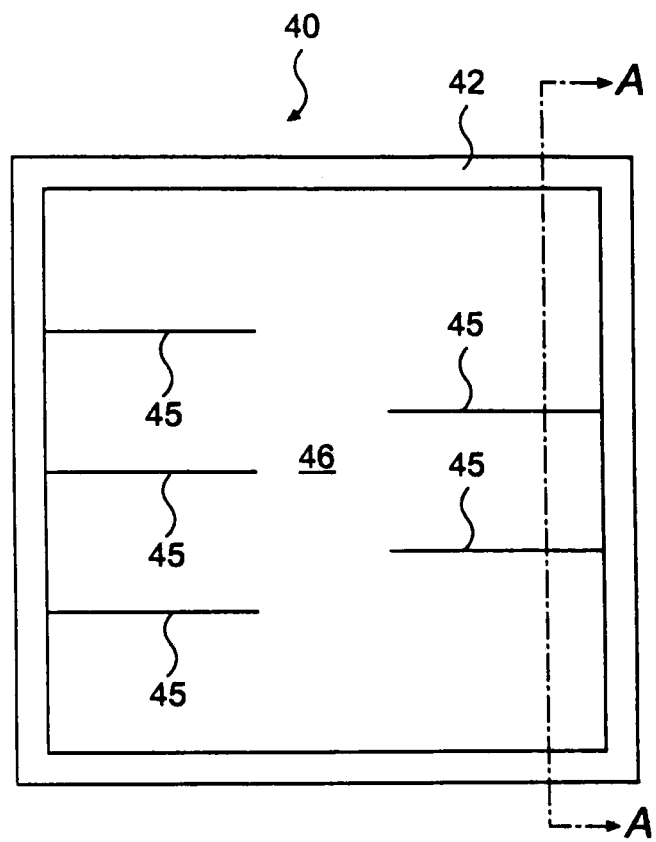
FIG. 16a is a top plan view of an explosion panel in accordance with another exemplary embodiment of the present invention.
Figure 16B:
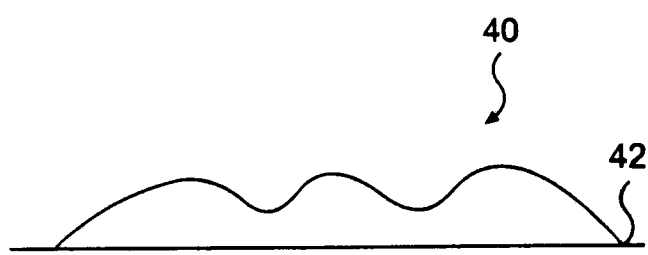

The present invention further contemplates that the transitional lines may extend from flange section 42 into domed section 46. As shown in FIGS. 14a and 14b, a series of three transitional lines 45 may extend from either side of rectangular flange section 42 into domes section 46. The transitional lines 45 may be parallel or, as illustrated in FIGS. 15a and 15b, the transitional lines 45 may be disposed at angles relative to each other. In addition, as illustrated in FIGS. 16a and 16b, explosion panel 40 may include three transitional lines 45 that extend from one side of flange section 42 and two transitional lines 45 that extend from the opposite side of flange section 42. It is further contemplated that many other variations on this aspect may be readily apparent to one skilled in the art and are considered within the scope of the present invention. For example, an explosion panel may include one or more transitional lines on one side of the domed section and zero or more transitional lines on the opposite side of the domed section.

In accordance with another aspect of the present invention, a fastener is provided to secure the flange section of the explosion panel to the frame. The fastener includes a head portion and a body portion. A wire connects the head portion to the body portion and is configured to break when exposed to a predetermined tensile load.

Figure 17A:
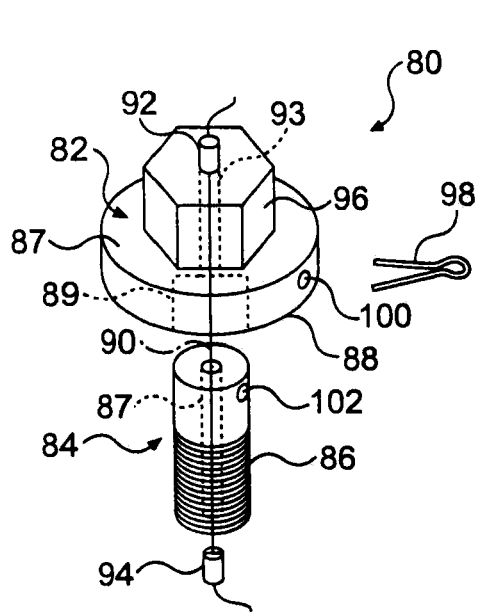
FIG. 17a is a pictorial representation of a fastener in accordance with an exemplary embodiment of the present invention.

As illustrated in FIG. 17a, a fastener 80 includes a head portion 82 and a body portion 84. Head portion 82 includes a flange 87 having a contact surface 88. Head portion 82 also includes a first opening 89 extending from contact surface 88. Head portion 82 further includes a second opening 93 that extends from first opening 89 to the top of head portion 82.

In addition, head portion 82 may include a conventional hexagonal bolt head 96. Bolt head 96 may be engaged by a tool, such as, for example, a wrench, to apply a torque to head portion 82. Bolt head 96 may be of any configuration readily apparent to one skilled in the art.

As also illustrated in FIG. 17a, body portion 84 includes a central opening 87 that may extend through body portion 84. Body portion 84 is disposable in first opening 89 of head portion 82 so that central opening 87 aligns with second opening 93 in head portion 82. Body portion 84 may also include a series of threads 86. Threads 86 may be configured to mate with corresponding threads in a frame or to mate with a nut.

As further shown in FIG. 17a, a wire 90 is disposed through second opening 93 in head portion 82 and through central opening 87 in body portion 84. A first locking member 92 is secured to wire 90 adjacent head portion 82. A second locking member 94 is secured to wire 90 adjacent body portion 84. First and second locking members 92 and 94 may be secured to wire 90 after body portion 84 is disposed within first opening 89 of head portion 82 to prevent body portion 84 from disengaging head portion 82.

Wire 90 is configured to fail when subject to a predetermined tensile force. As one skilled in the art will recognize, various characteristics of the wire may be altered to vary the force at which the wire will fail. For example, the wire gauge or material may be changed to vary the tensile strength of the wire. When the wire experiences a tensile load that equals or exceeds the tensile strength of the wire, the wire will fail and allow body portion 84 to disengage from head portion 82.

Figure 19:
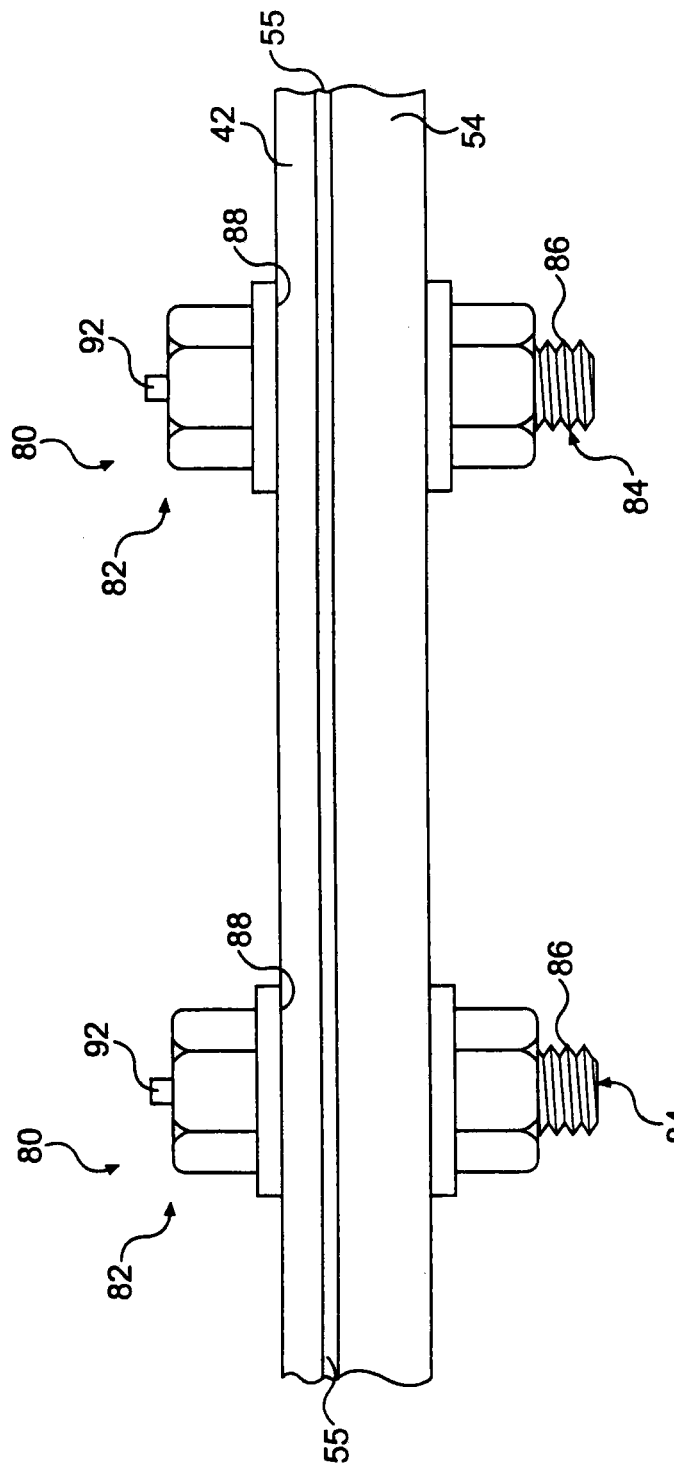
FIG. 19 is a side view of a pair of fasteners securing the flange of an explosion panel to a frame in accordance with the present invention.

As shown in FIG. 19, a series of fasteners 80 (two of which are illustrated) may be used to secure flange section 42 of an explosion panel to frame 54. Contact surface 88 of each head portion 82 engages the outlet surface of flange section 42. A gasket 55 may be disposed between flange section 42 and frame 54.

Fasteners 80 may be used to control the pressure differential at which the explosion panel opens. When the explosion panel experiences a positive pressure differential, flange section 42 will exert a corresponding force on each contact surface 88 of each fastener 80. If the force exerted by flange section on each contact surface 88 exceeds the tensile strength of wire 90, the wire will break and allow head portion 82 of each fastener 80 to disengage the respective body portion 84. After each wire 90 in each fastener 80 breaks, flange section 42 is free to move relative to frame 54 to open the explosion panel. It will be readily apparent that the pressure differential at which the explosion panel will open may be varied by modifying the wire within each fastener or by adjusting the number of fasteners used to secure the explosion panel to the frame.

Figure 17B:
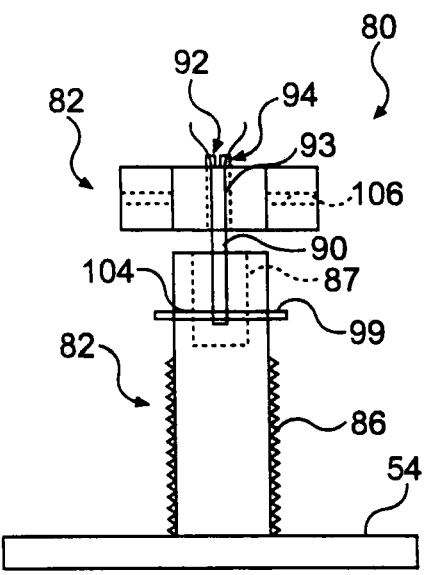
FIG. 17b is a sectional view of a fastener in accordance with another exemplary embodiment of the present invention.

Alternatively, as shown in FIG. 17b, body portion 84 of a series of fasteners 80 (one of which is illustrated) may be welded or otherwise securely fastened to frame 54, such as in a "stud bolt." In this configuration, flange section 42 of explosion panel is placed over the body portions 84 and an outlet frame (not shown) and/or head portion 82 are used to fix the explosion panel to the frame. Body portion 84 may include a pin 99 that is placed in an opening 104 disposed transversely to central opening 87. Wire 90 may be looped around pin 99, so that first and second locking members 92 and 94 may be disposed adjacent head end 82 of fastener 80 to connect head portion 82 with body portion 84. Wire 90 will therefore hold flange section 42 against frame 54 until the pressure differential causes wire 90 to break.

In yet another embodiment, head portion 82 may include an opening 106 that is configured to align with opening 104 in body portion 84. Wire 90 may be disposed through openings 104 and 106. First and second locking members 92 and 94 may be disposed on opposite sides of head portion 82 so that wire 90 connects head portion 82 with body portion 84 of fastener 80. Wire 90 will therefore hold flange section 42 against frame 54 until the pressure differential causes wire 90 to break.

The present invention contemplates that fasteners 80 may be disposed around the entire perimeter of flange section 42. Alternatively, fasteners 80 may be disposed around a portion of flange section 42 and conventional fasteners may be used to secure the remaining portions of flange section 42 to frame 54. In this embodiment, the conventional fasteners may define a hinge area. The conventional fasteners will not break when the wires 90 of each fastener 80 break. Thus, at least a portion of the flange section will remain fixed to the frame. In this manner, fragmentation of the explosion panel may be prevented.

As shown in FIG. 17a, an activation pin 98 may be used to secure head portion 82 to body portion 84. Head portion 82 includes an opening 100 that aligns with a corresponding opening 102 in body portion 84. Activation pin 98 may be disposed through openings 100 and 102 to secure head portion 82 to body portion 84 prior to the installation of fastener 80. When a torque is applied to head portion 82 to secure the flange section to the frame, activation pin 98 will prevent head portion 82 from rotating relative to body portion 84. A rotation of head portion 82 relative to body portion 84 may cause wire 90 to twist and thereby altering the force at which the wire will fail. Once fastener 80 is in place, activation pin 80 may be removed to "activate" the fastener.

Figure 18A:
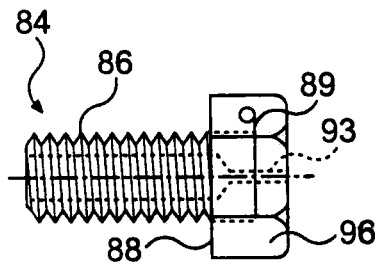
FIG. 18a is a sectional view of a fastener in accordance with another exemplary embodiment of the present invention.
Figure 18B:
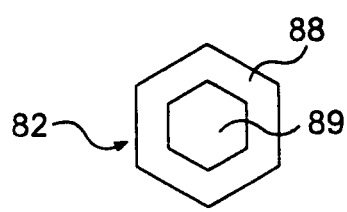
Figure 18C:
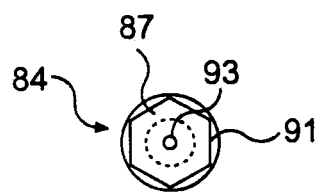

Alternatively, as shown in FIGS. 18a-18c, first opening 89 of head portion 82 and body portion 84 may include mating surfaces that will transmit a torque while still allowing head and body portion to easily disengage when the wire 90 breaks. For example, first opening 89 may have a hexagonal shape. Body portion 84 may include a corresponding hexagonal projection 91. When hexagonal projection 91 is engaged with first opening 89, a torque applied to head portion 82 may be transmitted to threads 86 of body portion 84 without altering the tensile strength of wire 90. It is contemplated that alternative configurations will be readily apparent to one skilled in the art.

In accordance with the present invention, a bracket for joining two sections of a pressure relief device is provided. A pressure relief device, such as an explosion panel, may be split into two structures, a first structure having a substantially flat flange section and a second structure having a domed section with an outer edge. The bracket may be secured to the first structure. The bracket includes a support configured to receive the outer edge of the second structure. The bracket may be used to align the second structure relative to the first structure or to connect the first structure with the second structure and control the set pressure of the explosion panel.

As illustrated in FIGS. 20 and 21a-21c, a bracket 110 includes a body portion 112 and a support 114. Support 114 may be disposed substantially perpendicular to body portion 112 or at an angle relative to body portion 112. A set of guides 122 may be disposed on either side of support 114. In the exemplary illustrated embodiment, each guide 122 includes a section that is angled away from support 114.

Bracket 110 may also include a tab 116. Tab 116 is disposed adjacent support 114. Tab 116 may include a pair of slits 118 that define a failure region 120. As described in greater detail below, slits 118 may be configured such that failure region 120 will fail when subject to a predetermined tensile load.

As illustrated in FIG. 22, bracket 110 is configured to join a first structure 124 and a second structure 128 to form a pressure relief device. First structure 124 includes a substantially flat flange section 125 that may include a series of openings (not shown). First structure 124 may also include a projection 126 that extends from flange section 125. Second structure 128 has a domed shape with an outer edge 129. First and second structures 124 and 128 may be created by cutting a formed explosion panel along the domed section. It is contemplated that a conventional explosion panel or an explosion panel according to any aspect of the present invention may be cut along the domed section to form first and second structures 124 and 128.

As shown, body portion 112 may be secured to projection 126 through a process such as, for example, spot welding.

Body portion 112 may extend along the entire periphery of projection 126. Alternatively, a series of brackets 110 may be disposed along the periphery of projection 126.

When body portion 112 is secured to first structure 124, support 114 is configured to receive outer edge 129 of second structure. Support 114 will provide support for the domed section of the explosion panel when the explosion panel is subject to a negative pressure differential. In a conventional explosion panel, which typically includes a circumferential slit to control burst pressure, the forces associated with a negative pressure differential will cause the upper portion of the explosion panel to override the lower portion of the explosion panel. In other words, an explosion panel having burst control tabs defined by a series of slits, or stitches, may be particularly susceptible to failure when subject to a negative pressure differential. The bracket of the present invention prevents the upper portion of the explosion panel from overriding the lower portion of the explosion panel Thus, a pressure relief device that includes a bracket may be less susceptible to failure when subject to a negative pressure differential.

Guides 122 are configured to ease the engagement of second structure 128 with support 114. In this manner, bracket 110 may be used as an alignment mechanism to join the domed section of the explosion panel with the flange section.

Tab 116 may be secured to second structure 128 to provide burst control in a positive pressure differential condition. When outer edge 129 of second structure 128 is engaged with support 114, tab 116 is positioned adjacent the convex surface of second structure 128. Tab 116 may be secured to second structure 128 through a process such as, for example, spot welding. Alternatively, tab 116 may be secured to second structure 128 by any other method readily apparent to one skilled in the art such as, for example, a wire closure. When tab 116 is secured to second structure, the explosion panel will be able to resist the tensile forces associated with a positive pressure differential. The failure region 120 of tab 116 may be configured to fail when the tensile force reaches a predetermined limit. In this manner, bracket 110 may be used to both support the explosion panel under a negative pressure differential and to provide burst control when the explosion panel is subject to a positive pressure differential.

Figure 9:
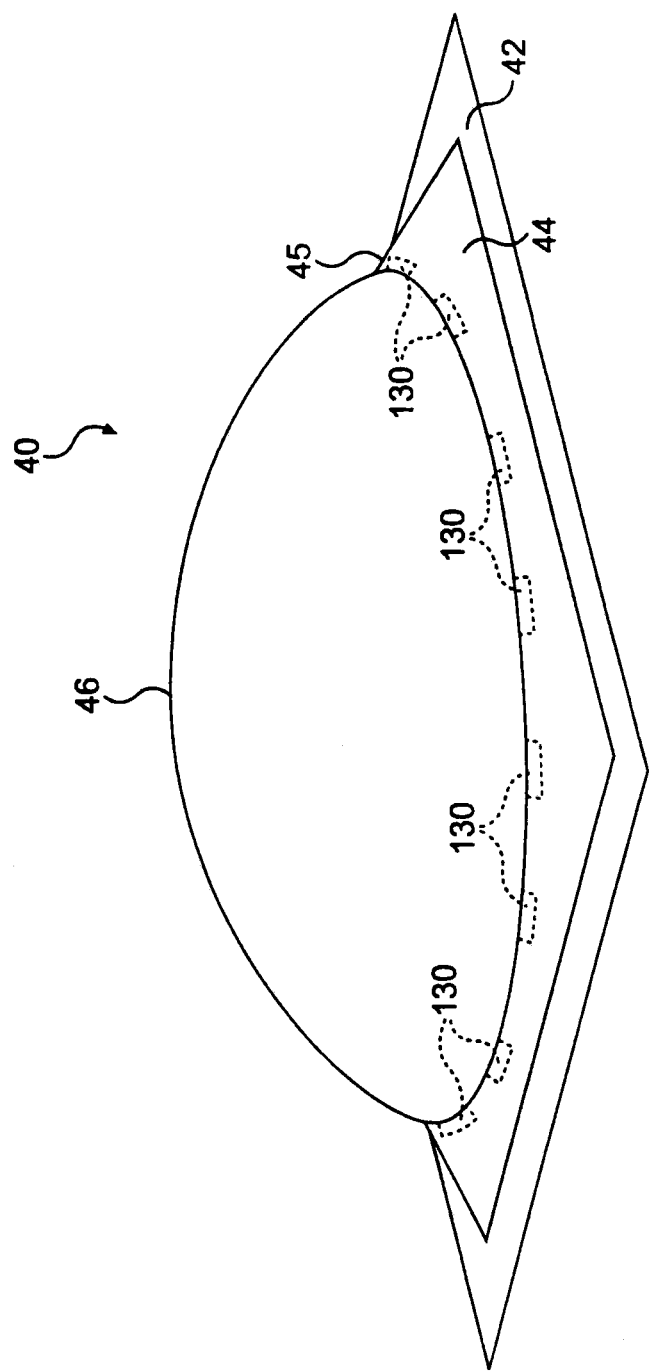
FIG. 9 is a pictorial representation of an explosion panel in accordance with another exemplary embodiment of to the present invention.

When using bracket 110 with an explosion panel as described above, a series of notches 130 may be formed in the domed section. Notches 130 may have a depth substantially equivalent to the thickness of support 114. As shown in FIG. 9, domed section 46 of explosion panel 40 may include a series of notches 130 that are disposed adjacent transitional line 45. Each notch 130 is configured to receive one support 114. Body portion 112 of bracket 110 may be spot welded to transitional section 44 when support is within notch 130. When bracket 110 is engaged with notch 130, dome section 46 will rest on support 114 (referring to FIG. 20) and/or on projection 126. Thus, a compressive force resulting from a negative pressure differential will act on either support 114 or transitional section 44. This will prevent tab 116, when attached to domed section 46, from experiencing cyclical pressure fluctuations that may fatigue tab 116 and thereby alter the material strength of failure region 120. The same concept may be used without a transitional line 45 by placing bracket 110 between an upper and lower dome area of a simple domed structure separated by a slit.

The bracket of the present invention may reduce the costs associated with manufacturing an explosion panel that will open when exposed to a certain pressure differential. As will be recognized by one skilled in the art, the configuration of burst control tabs necessary to achieve the desired opening characteristics is often determined through an iterative testing process. In other words, an operator may have to repeatedly test different burst control tab configurations to identify the configuration necessary to allow the explosion panel to open when subject to the predetermined pressure differential. In a conventional explosion panel, where the burst control tabs are formed directly in the domed section, this may require that the operator repeatedly move a sample explosion panel between a slit cutting device and a testing device to determine the proper configuration of the burst control tabs. This process may be expensive and time-consuming.

When using a bracket according to the present invention to control the burst pressure of the explosion panel, only the burst control tabs 116 of the bracket will need to be reconfigured in the iterative testing procedure. Thus, the burden of transporting the explosion panel between the testing and cutting locations may be removed. In addition, the burst control tabs of the bracket may be formed and reconfigured through a stamping process, which is less expensive than the cutting process. Moreover, in the testing process of the brackets, only the material of the bracket is subject to destruction, instead of the entire explosion panel. Thus, the bracket of the present invention may reduce the costs associated with manufacturing and testing an explosion panel.

It will be apparent to those skilled in the art that various modifications and variations can be made in the aforementioned embodiments without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fastener for engaging a pressure relief device with a frame, comprising:
a body portion configured to engage the frame;
a head portion having an opening configured to receive the body portion and a contact surface configured to engage the pressure relief device; and
a wire connecting the body portion to the head portion, the wire configured to break in tension and release the head portion when a predetermined force is exerted on the head portion.

2. The fastener of claim 1, wherein the head portion includes a flange having the contact surface.

3. The fastener of claim 1, wherein the body portion includes threads.

4. The fastener of claim 1, wherein each of the body portion and head portion include a central opening and the wire is disposed within the central opening of both the body portion and the head portion.

5. The fastener of claim 4, wherein a first locking member is securely fixed to a first end of the wire and is configured to engage the head portion and a second locking member is securely fixed to the second end of the wire and is configured to engage the body portion.

6. The fastener of claim 1, further including a pin selectively engageable with the body portion and the head portion to secure the body portion to the head portion.

7. The fastener of claim 6, wherein each of the body portion and head portion includes a pin opening configured to receive the pin.

8. The fastener of claim 1, wherein the opening in the head portion has a hexagonal shape configured to receive a corresponding hexagonal protrusion on the body portion.

9. A pressure relief assembly, comprising:
a pressure relief device having a flange including at least one opening, the pressure relief device being configured to engage with a frame; and
a fastener having:
a body portion fixably connected to the frame and having a central opening;
a head portion having an opening engageable with the body portion to secure the pressure relief device during use; and
a wire connecting the body portion to the head portion, the wire configured to break and release the head portion when the flange exerts a predetermined force on the head portion.

10. The pressure relief assembly of claim 9, wherein a pin is disposed transversely to the central opening of the body portion and the wire loops around the pin.

11. The pressure relief assembly of claim 10, wherein a pair of locking members are secured to each end of the wire.

12. The pressure relief assembly of claim 9, wherein a plurality of fasteners are disposed around a perimeter of the pressure relief device.

13. The pressure relief assembly of claim 9, further including a gasket disposed adjacent the flange of the pressure relief device.

14. The pressure relief assembly of claim 9, wherein the pressure relief device is an explosion panel.

15. The pressure relief assembly of claim 9, wherein the body portion includes an opening and the head portion includes an opening configured to align with the opening in the body portion, the wire disposable through the opening in the head portion and the opening in the body portion to secure the head portion to the body portion.

16. The pressure relief assembly of claim 9, wherein the body portion includes threads.

* * * * *